United States Patent
Nam et al.

(10) Patent No.: US 10,996,509 B2
(45) Date of Patent: May 4, 2021

(54) BACKLIGHT UNIT AND DISPLAY DEVICE HAVING THE SAME

(71) Applicant: Samsung Display Co., LTD., Yongin-si (KR)

(72) Inventors: Ji Eun Nam, Seoul (KR); Young Min Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/853,193

(22) Filed: Apr. 20, 2020

(65) Prior Publication Data
US 2021/0026202 A1 Jan. 28, 2021

(30) Foreign Application Priority Data
Jul. 25, 2019 (KR) .................... 10-2019-0089977

(51) Int. Cl.
*G02F 1/13357* (2006.01)
(52) U.S. Cl.
CPC .. *G02F 1/133606* (2013.01); *G02F 1/133603* (2013.01); *G02F 2001/133614* (2013.01)
(58) Field of Classification Search
CPC ......... G02F 1/133606; G02F 1/133603; G02F 2001/133614
See application file for complete search history.

(56) References Cited

U.S. PATENT DOCUMENTS

| | | | |
|---|---|---|---|
| 2012/0147592 A1* | 6/2012 | Takase | G02F 1/133608 362/97.1 |
| 2016/0124267 A1* | 5/2016 | Kim | F21V 7/0025 349/67 |
| 2018/0275450 A1* | 9/2018 | Sato | G02F 1/133608 |
| 2019/0212486 A1* | 7/2019 | Ahn | G02B 6/0058 |
| 2019/0243172 A1* | 8/2019 | Gotou | G02F 1/133608 |

FOREIGN PATENT DOCUMENTS

| | | | |
|---|---|---|---|
| JP | 2010272245 A | * | 12/2010 |
| JP | 2018-200375 | | 12/2018 |
| KR | 10-2017-0074947 | | 6/2017 |

OTHER PUBLICATIONS

Idegami et al, "Description JP2018200375A", Original date Dec. 20, 2018, Patent Translate Powered by EPO and Google, English translation of pp. 1-36.*
Takahashi, "Description JP2010272245A", Original date Dec. 2, 2010, Patent Translate Powered by EPO and Google, English translation of pp. 1-18.*
Cheng et al, "Description KR20170074947A", Original date Jun. 30, 2017, Patent Translate Powered by EPO and Google, English translation of pp. 1-12.*

* cited by examiner

*Primary Examiner* — Alan B Cariaso
(74) *Attorney, Agent, or Firm* — Kile Park Reed & Houtteman PLLC

(57) ABSTRACT

A backlight unit and a display device including the backlight unit are provided. A backlight unit includes a substrate, light sources on a surface of the substrate, and a light transmission adjustment layer on the surface of the substrate and spaced apart from the light sources in a thickness direction, wherein the light transmission adjustment layer includes a light reflection layer having openings disposed therein, and a light absorption layer containing a light absorption material that is disposed in the openings and absorbs light having predetermined wavelength bands.

21 Claims, 23 Drawing Sheets

300_2: 310, 320_2

300_3: 310, 320_3

300_4: 310, 320_4

BACKLIGHT UNIT AND DISPLAY DEVICE HAVING THE SAME

CROSS-REFERENCE TO RELATED APPLICATIONS

This application claims priority to and benefits of Korean Patent Application No. 10-2019-0089977 under 35 U.S.C. § 119, filed in the Korean Intellectual Property Office on Jul. 25, 2019, the entire contents of which are incorporated herein by reference.

BACKGROUND

1. Technical Field

The disclosure relates to a backlight unit and a display device including the same.

2. Description of the Related Art

A liquid crystal display device receives light from a backlight unit and displays an image. A backlight unit includes light sources. Light emitted from a light source is incident on a liquid crystal display panel through an optical film or the like.

Research is currently being conducted on the application of a reflective sheet including a patterned opening in order to improve luminance uniformity of a liquid crystal display device, to secure the appearance thereof, and to decrease the thickness thereof. A patterned opening is formed to have different areas and/or separation distances depending on a distance from a light source so that light may be diffused with different reflectance and transmittance depending on the distance from the light source.

For an edge-type backlight unit having a light source located at a side portion of a display panel, a diffusion plate is disposed on top of a light guide plate. On the other hand, for a direct-type backlight unit having a light source located below a display panel, a diffusion plate may directly face the light source.

As the thickness of the liquid crystal display device decreases, the distance between the light source and the diffusion plate decreases. When the distance between the light source and the diffusion plate decreases, hotspots may be created on a region above the light source, and thus luminance uniformity may be degraded. Light converted in wavelength by a wavelength conversion film may be concentrated on the outside of the light source, and light emitted from the light source may be relatively concentrated on a region above the light source, thereby degrading color reproducibility.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a backlight unit having improved chrominance and/or increased light diffusion and thus having a decreased optical distance.

Aspects of the disclosure also provide a display device including a backlight unit having improved chrominance and/or increased light diffusion and thus having a decreased optical distance.

It should be noted that objects of the disclosure are not limited to the above-described objects, and other objects of the disclosure will be apparent to those skilled in the art from the following descriptions.

According to an embodiment of the disclosure, a backlight unit comprises a substrate, a plurality of light sources disposed on a surface of the substrate, and a light transmission adjustment layer disposed on the surface of the substrate and spaced apart from the plurality of light sources in a thickness direction, wherein the light transmission adjustment layer comprises: a light reflection layer having a plurality of openings disposed therein; and a light absorption layer containing a light absorption material that is disposed in the openings and absorbs light having predetermined wavelength bands.

In an embodiment, the plurality of light sources may emit light having a first wavelength band, and the light absorption layer may transmit the light having the first wavelength band.

In an embodiment, the backlight unit may further comprise a wavelength conversion film disposed above the light transmission adjustment layer to convert the light having the first wavelength band into light having a second wavelength band different from the first wavelength band.

In an embodiment, the light absorption material of the light absorption layer may absorb the light having the second wavelength band.

In an embodiment, the backlight unit may further comprise a diffusion plate disposed between the light transmission adjustment layer and the wavelength conversion film.

In an embodiment, the light reflection layer may include one surface facing the plurality of light sources and another surface opposite the one surface, and the light absorption layer may be disposed to fill the plurality of openings and cover the one surface or the another surface of the light reflection layer around the plurality of openings.

In an embodiment, the light absorption layer may expose a portion of the another surface of the light reflection layer in the thickness direction.

In an embodiment, the light absorption layer may be disposed to entirely cover the one surface of the light reflection layer.

In an embodiment, an interval between the plurality of openings may decrease as the plurality of openings are away from corresponding ones of the plurality of light sources.

In an embodiment, the plurality of openings may be disposed to surround the plurality of light sources.

According to an embodiment of the disclosure, a backlight unit including unit light source regions arranged in a matrix shape, the backlight unit comprises a light source member comprising a substrate; and a plurality of light sources disposed on a surface of the substrate; and a light transmission adjustment layer comprising: a light reflection layer disposed above the light source member and overlapped with the light source member, the light reflection layer having a plurality of openings disposed therein; and a light absorption layer within the plurality of openings, wherein, the plurality of light sources are disposed in the unit light source regions, each of the unit light source regions comprises a light reflection region where light emitted by a corresponding light source is reflected and a light transmission region where the light emitted by the light source is transmitted, the light reflection layer is disposed in the light reflection region, and the plurality of openings are disposed in the light transmission region.

In an embodiment, the light transmission region may comprise a plurality of patterned light transmission regions, and the plurality of patterned light transmission regions may be spaced apart from one another.

In an embodiment, the light reflection region may be disposed substantially at the center of each of the unit light source regions.

In an embodiment, a first opening disposed in a first light transmission region spaced a first distance from the center of each of the unit light source regions may have a substantially smaller area than a second opening disposed in a second light transmission region spaced a second distance, which may be substantially greater than the first distance, from the center.

In an embodiment, the plurality of light sources may be disposed substantially at the centers of the unit light source regions.

In an embodiment, the light reflection region may be overlapped with the light sources in a thickness direction, and at least a portion of the light reflection region may be disposed at the centers of the unit light source regions.

In an embodiment, the light reflection region disposed above the plurality of light sources may have a substantially larger area than the plurality of light sources.

In an embodiment, the plurality of light sources may emit light having a first wavelength band, and the light absorption layer may be disposed in the light absorption region and a portion of the light reflection region and may be configured to transmit the light having the first wavelength band and may be configured to absorb light having a second wavelength band different from the first wavelength band.

According to an embodiment of the disclosure, a display device comprises a backlight unit comprising a substrate, a light source disposed on a surface of the substrate and to emit blue light, a light reflection layer disposed above the light source, the light reflection layer having a plurality of openings disposed therein, a light absorption layer in the plurality of openings, a diffusion plate disposed over the light reflection layer, and a wavelength conversion film disposed above the diffusion plate to convert the blue light into yellow light, and a display panel disposed above the backlight unit, wherein the light absorption layer transmits the blue light and absorbs the yellow light.

In an embodiment, the plurality of openings may not be overlapped with the light source in a thickness direction, and the light reflection layer disposed above the light source may have a substantially larger width than the light source.

In an embodiment, the display device may further comprise a reflective coating layer disposed on the surface of the substrate where the light source is exposed.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
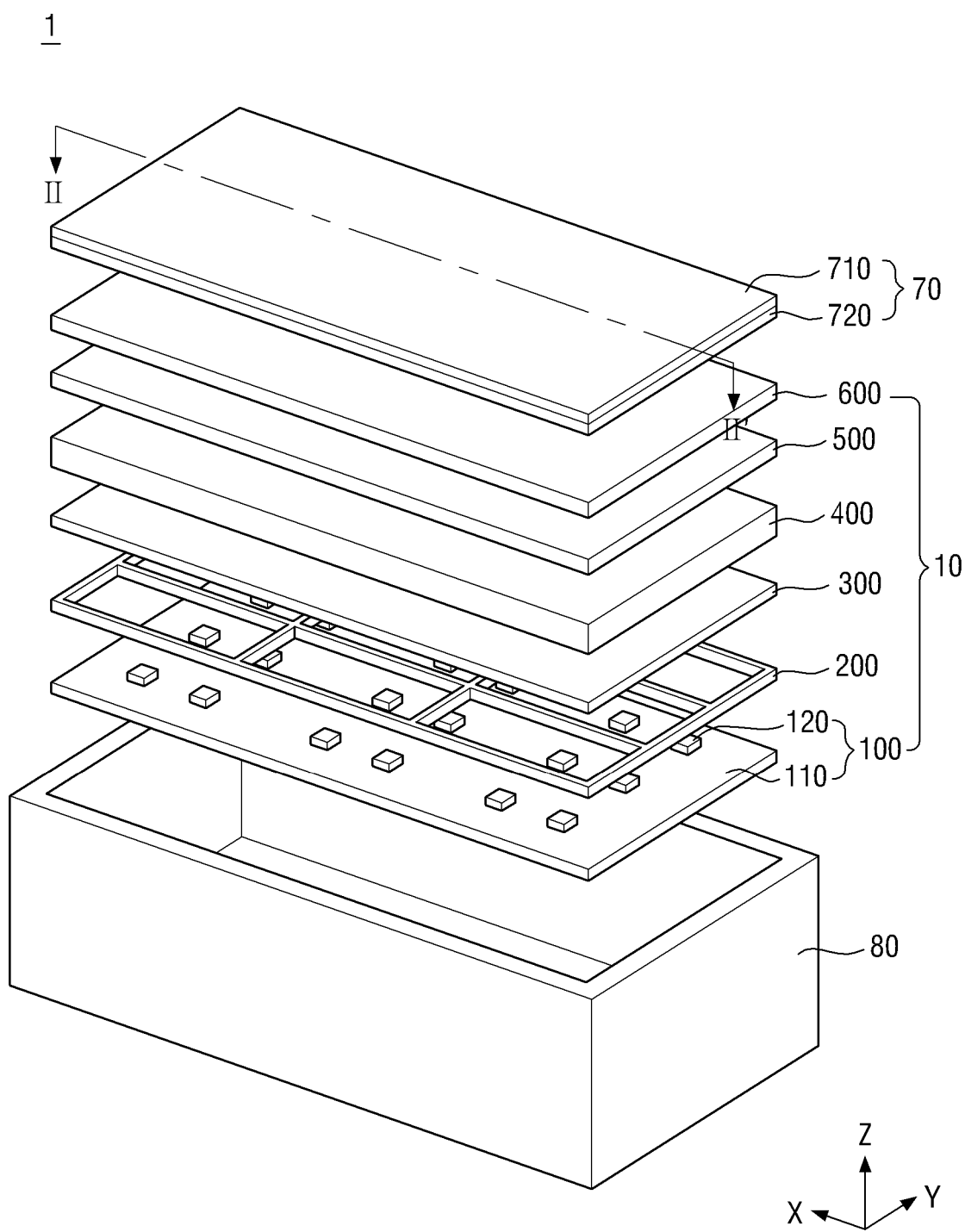
FIG. 1 is an exploded perspective view of a display device according to an embodiment.

The disclosure will now be described more fully hereinafter with reference to the accompanying drawings, in which embodiments of the disclosure are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

Some of the parts which are not associated with the description may not be provided in order to describe embodiments and like reference numerals refer to like elements throughout the specification.

In the drawings, sizes and thicknesses may be enlarged for clarity and ease of description thereof. However, the disclosure is not limited to the illustrated sizes and thicknesses. In the drawings, the thicknesses of layers, films, panels, regions, and other elements may be exaggerated for clarity. In the drawings, for better understanding and ease of description, the thicknesses of some layers and areas may be exaggerated.

Further, in the specification, the phrase "in a plan view" means when an object portion is viewed from above, and the phrase "in a schematic cross-sectional view" means when a schematic cross-section taken by vertically cutting an object portion is viewed from the side.

Additionally, the terms "overlap" or "overlapped" mean that a first object may be above or below or to a side of a second object, and vice versa. Additionally, the term "overlap" may include layer, stack, face or facing, extending over, covering or partly covering or any other suitable term as would be appreciated and understood by those of ordinary skill in the art. The terms "face" and "facing" mean that a first element may directly or indirectly oppose a second element. In a case in which a third element intervenes between the first and second element, the first and second element may be understood as being indirectly opposed to one another, although still facing each other. When an element is described as 'not overlapping' or 'to not overlap' another element, this may include that the elements are spaced apart from each other, offset from each other, or set aside from each other or any other suitable term as would be appreciated and understood by those of ordinary skill in the art.

When a layer, film, region, substrate, or area, is referred to as being "on" another layer, film, region, substrate, or area, it may be directly on the other film, region, substrate, or area, or intervening films, regions, substrates, or areas, may be present therebetween. Conversely, when a layer, film, region, substrate, or area, is referred to as being "directly on" another layer, film, region, substrate, or area, intervening layers, films, regions, substrates, or areas, may be absent therebetween. Further when a layer, film, region, substrate, or area, is referred to as being "below" another layer, film, region, substrate, or area, it may be directly below the other layer, film, region, substrate, or area, or intervening layers, films, regions, substrates, or areas, may be present therebetween. Conversely, when a layer, film, region, substrate, or area, is referred to as being "directly below" another layer, film, region, substrate, or area, intervening layers, films, regions, substrates, or areas, may be absent therebetween. Further, "over" or "on" may include positioning on or below an object and does not necessarily imply a direction based upon gravity.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 5% of the stated value.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

Hereinafter, embodiments of the disclosure will be described in detail with reference to the accompanying drawings.

Figure 2:
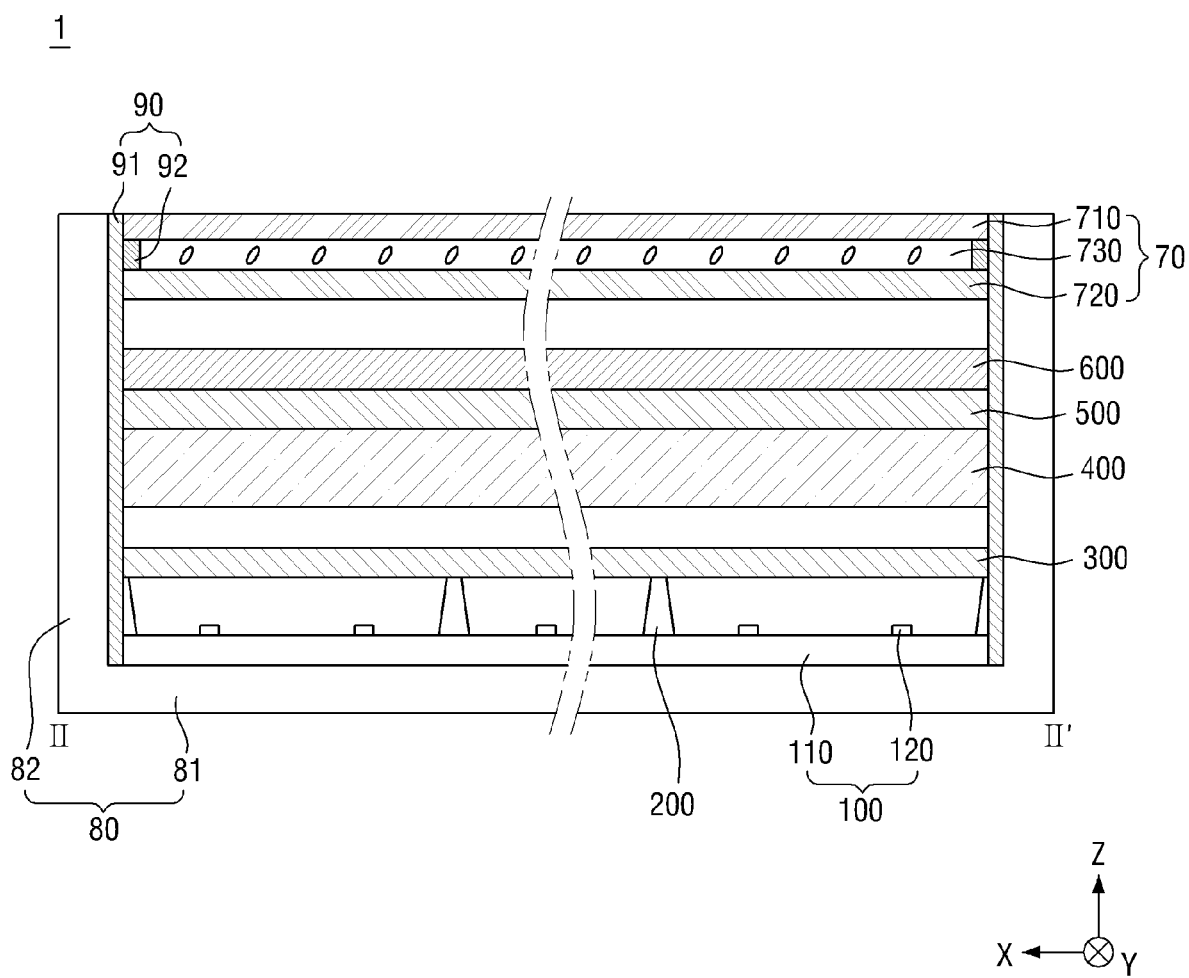
FIG. 2 is a schematic cross-sectional view taken along line II-II' of FIG. 1.

FIG. 1 is an exploded perspective view of a display device according to an embodiment. FIG. 2 is a schematic cross-sectional view taken along line II-II' of FIG. 1.

Referring to FIGS. 1 and 2, a display device 1 is a device for displaying pictures or images. For example, the display device 1 may include various electronic devices such as a television, an external billboard, a monitor, a personal computer, a notebook computer, a tablet PC, a smartphone, a navigation unit, a camera, a center information display (CID) provided in a vehicle, a wristwatch electronic device, a personal digital assistant (PDA), a portable multimedia player (PMP), and a game console. These devices are, however, merely examples, and it will be appreciated that the display device 1 may be applied to other electronic devices without departing from the spirit and scope of the disclosure.

In the drawings, a first direction X, a second direction Y, and a third direction Z are defined. The first direction X and the second direction Y may be vertical or perpendicular to each other in one plane. The third direction Z may be vertical or perpendicular to the plane where the first direction X and the second direction Y are located. The third direction Z may be vertical or perpendicular to the first direction X and the second direction Y. In embodiments, the third direction Z indicates a thickness direction of the display device 1.

Unless stated otherwise in the embodiments, an upper portion or an upper side, which is one side of the third direction Z, indicates the thickness direction (an upper side in the drawing) of the display device 1. Likewise, an upper surface indicates a surface facing one side of the third direction Z. Also, a lower portion or a lower side, which is the other side of the third direction Z, indicates the opposite direction (a lower side in the drawing) to the thickness direction of the display device 1, and a lower surface refers to a surface facing the other side of the third direction Z.

The display device 1 may have a planar shape of a rectangle including long and short sides. The long sides may be in the first direction X, and the short sides may be in the second direction Y. However, the embodiments are not limited thereto. The short sides may be in the first direction X, and the long sides may be in the second direction Y. In the planar shape of the display device 1, a corner portion where one long side and one short side of the display device 1 meet each other may form a right angle, but the disclosure is not limited thereto. The corner portion may have a rounded or curved shape. The planar shape of the display device 1 is not limited to the above example and may include a square, a circle, an ellipse, or other shapes within the spirit and scope of the disclosure. The display device 1 may have a display surface disposed on one side of the third direction Z, which is the thickness direction.

The display device 1 may include a display panel 70, a backlight unit 10 disposed below the display panel 70 to provide light to the display panel 70, and a housing 80 to house the display panel 70 and the backlight unit 10.

The display panel 70 may receive light emitted from the backlight unit 10 and display an image on a screen, for example. The display panel 70 may be a non-self-emitting display panel and may include, for example, a liquid crystal display panel, an electrowetting display panel, or an electrophoretic display panel. Hereinafter, a case where the display panel 70 is a liquid crystal display (LCD) panel will be described by way of example. However, it will be apparent that the following description may be similarly applied to a case where the display panel 70 is of a different type.

The display panel 70 may include an upper substrate 710, a lower substrate 720 facing the upper substrate 710, and a liquid crystal layer 730 (as illustrated in FIG. 2) disposed therebetween. The display panel 70 may include pixels. The pixels of the display panel 70 may be arranged in a matrix form. The display panel may include a pixel electrode and a switching device provided for each pixel and a common electrode facing the pixel electrode. The switching device and the pixel electrode may be disposed on the lower substrate 720, and the common electrode may be disposed on the upper substrate 710. However, the disclosure is not limited thereto, and the common electrode may also be disposed on the lower substrate 720. A sealing member 92 may be disposed at the edges of the upper substrate 710 and the lower substrate 720 to seal liquid crystal molecules of the liquid crystal layer 730.

The backlight unit 10 is disposed below the display panel 70. The backlight unit 10 may include a light source member 100, a support frame 200, a light transmission adjustment layer 300, a diffusion plate 400, a wavelength conversion film 500, and an optical sheet 600.

The light source member 100 may include a substrate 110 and light sources 120 disposed on the substrate 110. The light sources 120 may emit light to be provided to the display panel 70. The light emission of the light sources 120 may be mostly directed upward in the figure. Accordingly, the light emitted from the light sources 120 may be mostly incident on the light transmission adjustment layer 300 disposed above the light sources 120.

The light transmission adjustment layer 300 may be disposed above the light source member 100 in an overlapping manner. The light emitted from the light sources 120 may be incident on the light transmission adjustment layer 300. The light transmission adjustment layer 300 may reflect a portion of the light emitted from the light sources 120 and may transmit other portion of the light emitted from the light sources 120. Also, when light emitted to the wavelength conversion film 500 through the light transmission adjustment layer 300 is reflected and incident on the light transmission adjustment layer 300, the light transmission adjustment layer 300 may absorb a portion of the light incident on the light transmission adjustment layer 300 or may reflect other portion of the light toward the wavelength conversion film 500.

The support frame 200 may be disposed between the substrate 110 of the light source member 100 and the light transmission adjustment layer 300. The support frame 200 may be disposed in direct contact with an upper surface of the substrate 110 and a lower surface of the light transmission adjustment layer 300. The support frame 200 may maintain a certain or predetermined distance such that the light sources 120 and the light transmission adjustment layer 300 are spaced apart from each other in the thickness direction.

The support frame 200 may be disposed to surround at least one light source 120 when viewed from the top down. The support frame 200 may have a substantially lattice shape surrounding the light sources 120 arranged in a matrix form. In the drawing, the support frame 200 is shown as surrounding two light sources 120. However, the disclosure is not limited thereto, and the support frame 200 may be disposed to surround one light source 120 or three or more light sources 120 within the spirit and scope of the disclosure.

The support frame 200 may not be overlapped with the light sources 120 on the substrate 110 in the thickness direction. In an embodiment, the support frame 200 may be formed to have a substantially lattice shape and disposed on the substrate 110. However, the disclosure is not limited thereto, and the support frame 200 may be formed in another planar shape. The backlight unit 10 may include multiple support frames 200 which may be coplanar with each other and/or arranged in a matrix shape or form.

The light source member 100, the support frame 200, and the light transmission adjustment layer 300 will be described in detail below.

The diffusion plate 400 may be disposed on the light transmission adjustment layer 300. The diffusion plate 400 may function to diffuse light emitted from the light transmission adjustment layer 300.

The diffusion plate 400 may be spaced apart from the light transmission adjustment layer 300 in the third or thickness direction Z. The diffusion plate 400 may be spaced a predetermined distance from the light transmission adjustment layer 300 and disperse light emitted from the light sources 120 and prevent the light from being concentrated in any particular region or area of the display panel 70. The diffusion plate 400 serves to diffuse light emitted from the light transmission adjustment layer 300 toward the display panel 70 and provide the light emitted from the light sources 120 to the display panel 70 with more uniform brightness.

However, the disclosure is not limited thereto, and the diffusion plate 400 may be disposed on the light transmission adjustment layer 300.

The diffusion plate 400 may contain a light transmissive material. The diffusion plate 400 may contain, for example, polymethyl methacrylate (PMMA), polystyrene (PS), polypropylene (PP), polyethylene terephthalate (PET), polycarbonate (PC), and other materials within the spirit and scope of the disclosure.

The wavelength conversion film 500 may be disposed on the diffusion plate 400. The wavelength conversion film 500 serves to convert the wavelength of the light (or a portion of the light) emitted from the diffusion plate 400 toward the display panel 70.

At least one optical sheet 600 may be disposed on the wavelength conversion film 500. The optical sheet 600 may perform an optical function such as concentration, refraction, diffusion, reflection, polarization, phase delay, for example, on incident light. The optical sheet 600 may include, for example, a prism sheet, a microlens, a lenticular sheet, a diffusion sheet, a polarizing sheet, a reflective polarizing sheet, a retardation sheet, a protective sheet, and the like. In an embodiment, the optical sheet 600 may be a composite of layers having optical functions.

The housing 80 may house the backlight unit 10 and the display panel 70. The housing 80 may include a bottom chassis or a bracket. Although not shown, the housing 80 may further include a top chassis.

The housing 80 may include a bottom surface 81 and a sidewall 82. The sidewall 82 of the housing 80 may be connected to the bottom surface 81 and then may be bent vertically. The light source member 100 of the backlight unit 10 may be disposed on the bottom surface 81 of the housing 80. The support frame 200, the light transmission adjustment layer 300, the diffusion plate 400, the wavelength conversion film 500, and the optical sheet 600 of the backlight unit 10, and the display panel 70 may be fastened to the sidewall 82 of the housing through an adhesive tape 91. The adhesive tape 91 and the sealing member 92 may generally be referred to as fixing members 90. The disclosure is not limited thereto, and the above-described members may be mounted on another seating structure of the housing 80 or may be mounted on or attached to a mold frame provided inside the housing 80.

Figure 3:
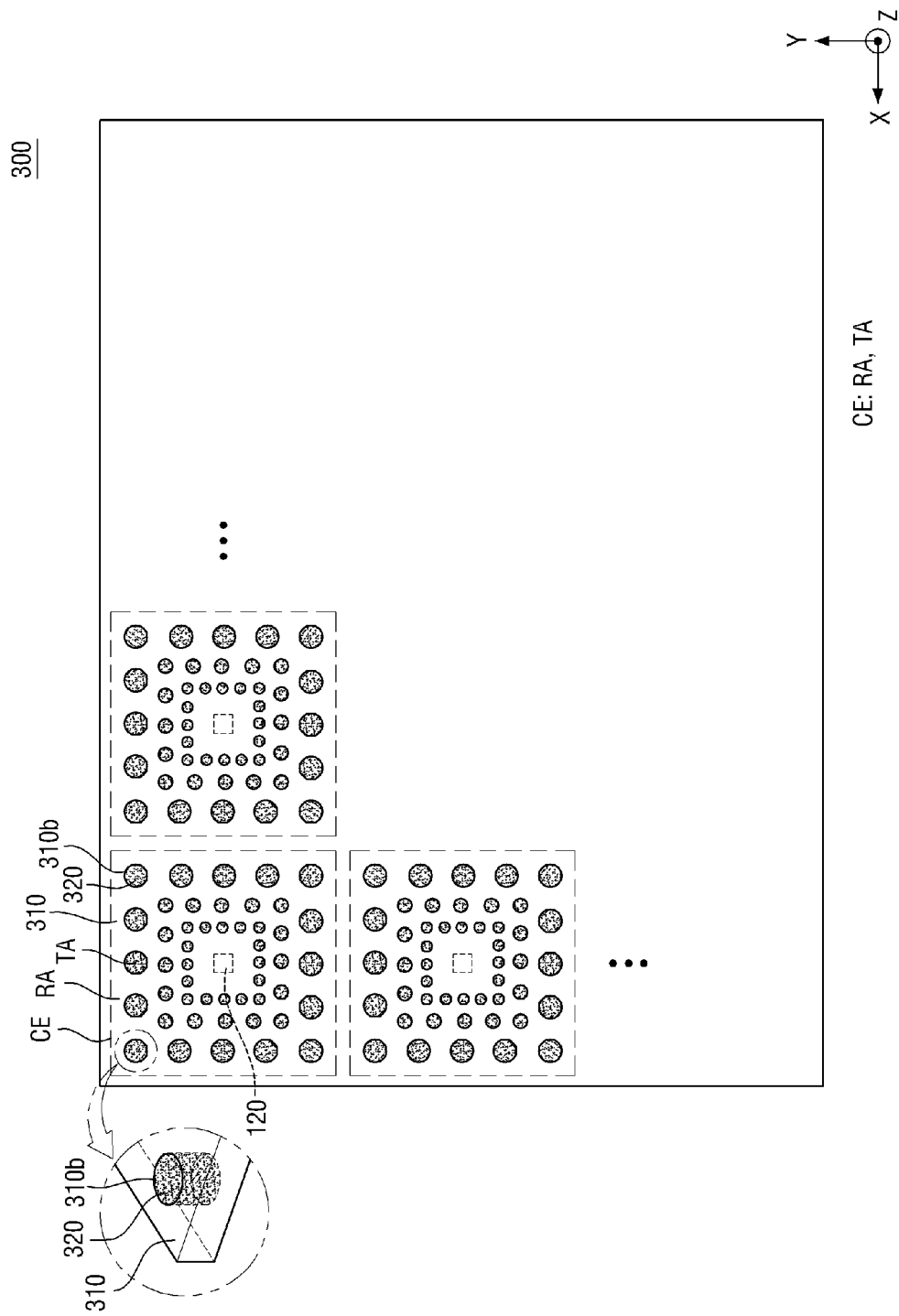
FIG. 3 is a layout diagram showing a relative positional relationship between a light transmission adjustment layer and a light source of a light source member according to an embodiment.

FIG. 3 is a layout diagram showing a relative positional relationship between a light transmission adjustment layer and a light source of a light source member according to an embodiment.

Referring to FIG. 3, light sources 120 may be arranged in a matrix form. The light sources 120 may be coplanar with and spaced a predetermined distance from one another in the first direction X and the second direction Y. The light sources 120 being spaced apart from one another may be construed that light-emitting elements of the light sources 120 may be separated apart from one another. Thus, the light sources 120 being spaced apart from one another may include a case that light source packages of the light sources 120 are adjacent to or connected to one another as long as the light-emitting elements of the light sources 120 are spaced apart from one another, as well as a case that the light source packages of the light sources 120 are spaced apart from one another. In the drawing, it is illustrated that the arrangement directions of the light sources 120 are matched with the extension directions of the long sides and the short sides of the display device 1. However, the disclosure is not limited thereto, and the arrangement directions of the light sources 120 may be inclined to the extension directions of the long sides and the short sides of the display device 1 at a predetermined angle. The embodiment illustrated in FIG. 3, for example, shows a case where the rows and columns of the arrangement of the light sources 120 extend linearly, but the light sources 120 may be disposed such that neighboring rows and/or neighboring columns substantially cross each other.

Unless otherwise stated in FIG. 3, the distance in the first direction X between the light sources 120 may be defined as the closest distance among distances between two sides of two light sources 120 adjacent to each other in the first direction X, the two sides facing each other in the first direction X, and the distance in the second direction Y between the light sources 120 may be defined as the closest distance among distances between two sides of two light sources 120 adjacent to each other in the second direction Y, the two sides facing each other in the second direction Y.

The distance in the first direction X between the light sources 120 may be the same as the distance in the second direction Y between the light sources 120, as shown in FIG. 3. However, the disclosure is not limited thereto, and the distance between the light sources 120 adjacent to each other in the first direction X may be different from the distance between the light sources 120 adjacent to each other in the second direction Y.

The light transmission adjustment layer 300 may include a light reflection layer 310 having openings 310*b* disposed therein and a light absorption layer or material 320 disposed in the openings 310*b*. The openings 310*b* may be patterned inside the light reflection layer 310 and disposed to pass through the light reflection layer 310 in the thickness direction. The light absorption layer 320 may be a continuous layer or a discrete shape or configuration. As illustrated in FIG. 3, for example, the light absorption layer 320 may be substantially circular when viewed from the top down or may be substantially cylindrical when viewed from a side. The light absorption layer 320 may be a light absorption material.

The light transmission adjustment layer 300 may be divided into various regions, cells, or the like depending on relative placements and patterns between the light source 120 and the patterned openings 310*b*.

In detail, the light transmission adjustment layer 300 may include unit light source regions CE when viewed from the top down. The unit light source regions CE may be defined as regions which correspond to the light sources 120 and where the unit patterns of the openings 310*b* of the light transmission adjustment layer 300 disposed above the light source member 100 are formed through partitioning.

As shown in FIG. 3, the unit light source regions CE may be arranged on the light transmission adjustment layer 300 in a matrix form. Each of the unit light source regions CE may have a substantially square shape when viewed from the top down. The unit light source regions CE may have substantially the same size. The unit light source regions CE may be arranged in the first direction X and the second direction Y. In the drawing, it is illustrated that the arrangement directions of the unit light source regions CE are matched with the extension directions of the long sides and the short sides of the display device 1. However, the disclosure is not limited thereto, and the arrangement directions of the unit light source regions CE may be inclined to the extension directions of the long sides and the short sides of the display device 1 at a predetermined angle. As an example, the embodiment illustrated in FIG. 3 shows a case where the rows and columns of the arrangement of the unit light source regions CE extend linearly, but the unit light source regions CE may be disposed such that neighboring rows and/or neighboring columns substantially cross each other.

As shown in FIG. 3, each of the unit light source regions CE may include a light reflection region RA and a light transmission region TA.

The light transmission regions TA may be formed or patterned in the unit light source regions CE.

The light transmission regions TA may be spaced a predetermined distance from one another. The distance between adjacent light transmission regions TA may differ depending on a distance from the light source 120. For example, when viewed from the top down, the distance or interval between adjacent light transmission regions TA may decrease as the distance from the light source 120 increases. At least one light source 120 may be disposed in each unit light source region CE. In an embodiment, each light source 120 may be disposed in a corresponding unit light source region CE. Each light source 120 may be disposed about or approximately at the center of a corresponding unit light source region CE. The distance between adjacent light transmission regions TA may decrease as they are disposed more outwardly or away from the center of the unit light source region CE where the light source 120 is disposed. However, the disclosure is not limited thereto, and in other embodiments the distance between adjacent light transmission regions TA may be substantially the same regardless of the distance from the light source 120 when viewed from the top down.

The planar shape of the light transmission regions TA may be a circle. The light transmission regions TA may not have the same area. When viewed from the top down, the area of each of the light transmission regions TA may increase as the distance from the light source 120 increases. For example, the area of a first light transmission region spaced a first distance from the center of a corresponding unit light source region CE may be smaller than the area of a second light transmission region spaced a second distance which is greater than the first distance. In an embodiment, a light source 120 may be disposed substantially at the center of a corresponding unit light source region CE, and the area of a light transmission region TA may increase outwardly from the center of the unit light source region CE where the light source 120 is disposed. However, the disclosure is not limited thereto, and the light transmission region TA may be formed to have various planar shapes and/or areas as described above.

The light transmission region TA may be a region that transmits a portion of light that is emitted from the light source 120 and incident on the light transmission adjustment layer 300. The openings 310b of the light transmission adjustment layer 300 may be disposed in the light transmission region TA.

The light reflection region RA may be an area of the unit light source region CE except for the light transmission region TA. A portion of the light reflection region RA may be disposed substantially at the center of the unit light source region CE.

The light reflection region RA is a region where light emitted from the light source 120 and incident on the light transmission adjustment layer 300 is reflected. The light reflection layer 310 of the light transmission adjustment layer 300 may be disposed in the light reflection region RA.

The light reflection region RA may be overlapped with the light source 120 in the thickness direction of the display device 1. At least a portion of the light reflection region RA may be disposed substantially at the center of the unit light source region CE. The light reflection region RA disposed substantially at the center of the unit light source region CE may completely cover the light source 120 disposed substantially at the center of the unit light source region CE. For example, the area of the light reflection region RA disposed substantially at the center of the unit light source region CE may be greater than the area of the corresponding light source 120.

The light transmission regions TA of the unit light source regions CE may have substantially the same pattern. However, the disclosure is not limited thereto, and the light transmission regions TA of the unit light source regions CE may have different patterns. Although not shown, the pattern of the light transmission region TA may be a lattice pattern or a concentric pattern when viewed from the top down. For example, the lattice pattern may be a square lattice pattern, a rhombus lattice pattern, a triangular lattice pattern, or a hexagonal lattice pattern. As an example, the unit light source region CE may have a different size and/or shape depending on the pattern of the corresponding light transmission region TA.

The light reflection layer 310 may reflect at least a portion of the light emitted from the light source 120. The openings 310b passing through the light reflection layer 310 may be patterned and disposed inside the light reflection layer 310. The openings 310b may transmit at least a portion of the light emitted from the light source 120. For example, by adjusting the reflection and transmission of the light emitted from the light source 120 according to the light reflection layer 310 and the pattern of the openings 310b disposed in the light reflection layer 310, it is possible to diffuse the light emitted from the light source 120. Accordingly, by primarily diffusing the light emitted from the light source 120 before the light is incident on the diffusion plate 400, it is possible to improve luminance uniformity.

The light reflection layer 310 may have a planar shape substantially similar to that of the display panel 70. For example, when the display panel 70 has a rectangular planar shape, the light reflection layer 310 may have a rectangular planar shape similar to that of the display panel 70. The light reflection layer 310 may have substantially the same size as the display panel 70 when viewed from the top down, but the disclosure is not limited thereto.

The light reflection layer 310 may include an upper surface and a lower surface. The upper surface and the lower surface of the light reflection layer 310 may face each other. Each of the upper surface and the lower surface of the light reflection layer 310 may be located in one plane. The plane where the upper surface is located and the plane where the lower surface is located may be substantially parallel to each other and may have an overall uniform thickness.

The openings 310b disposed in the light transmission region TA may have the same planar shape and size as the corresponding light transmission region TA. For example, when the planar shape of the light transmission region TA is a circle, the planar shape of the openings 310b disposed in the light transmission region TA may also be a circle. As an example, the area of the light transmission region TA increases as the distance from the center of the unit light source region CE increases. Accordingly, the openings 310b may be patterned and formed such that the area of the planar shape of the openings 310b increases as the distance from the center of the unit light source region CE increases.

The openings 310b may be formed to completely pass through the light reflection layer 310 in the thickness direction. The openings 310b may be in the shape of a cylinder having a predetermined radius and a predetermined height.

Accordingly, the upper and lower surfaces of the openings 310b may be circular and equal in size, and the height of the openings 310b may be the same as the height of the light reflection layer 310.

The light reflection layer 310 disposed in the light reflection region RA may have the same planar shape and size as the corresponding light reflection region RA.

The configuration of the light reflection layer 310 will be described below in detail with reference to FIG. 6.

Figure 4:
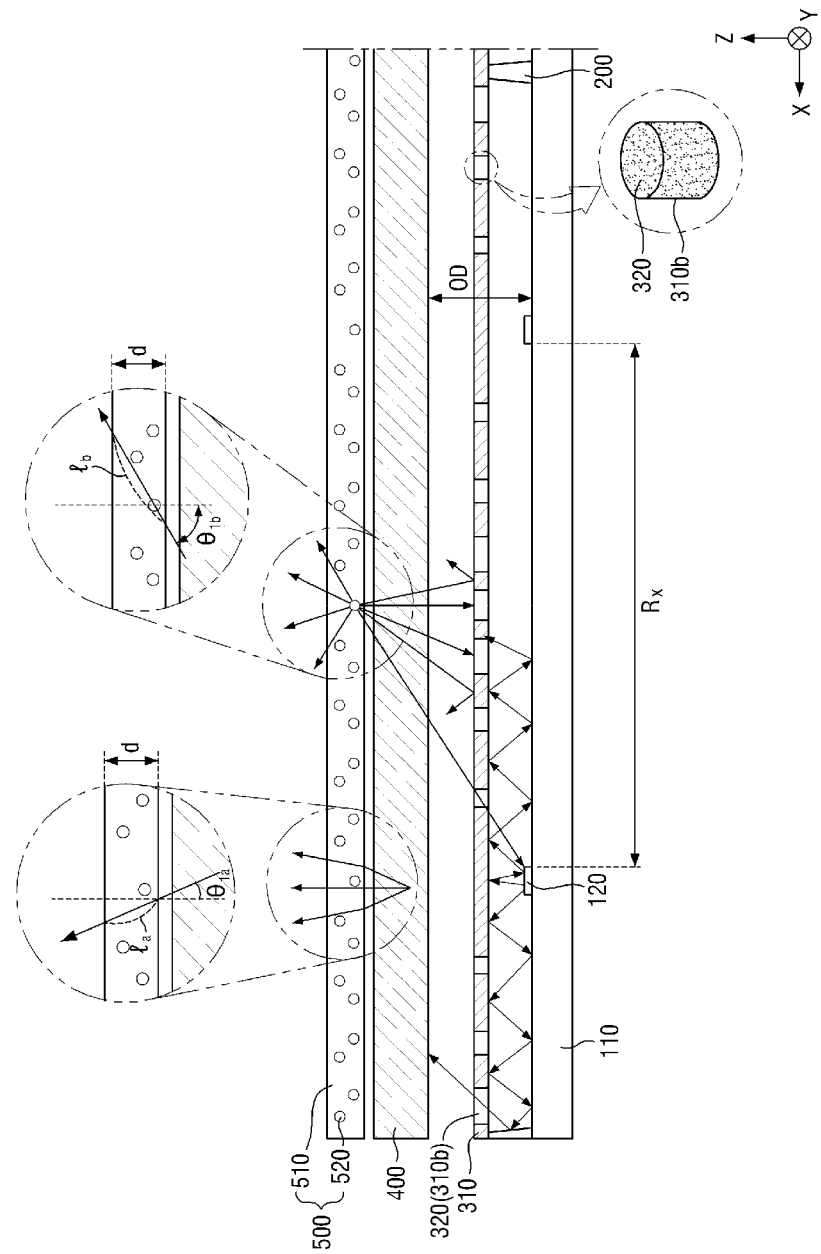
FIG. 4 is an enlarged schematic cross-sectional view partially showing a light source member, a support frame, a light transmission adjustment layer, a diffusion plate, and a wavelength conversion film according to an embodiment.
Figure 5:
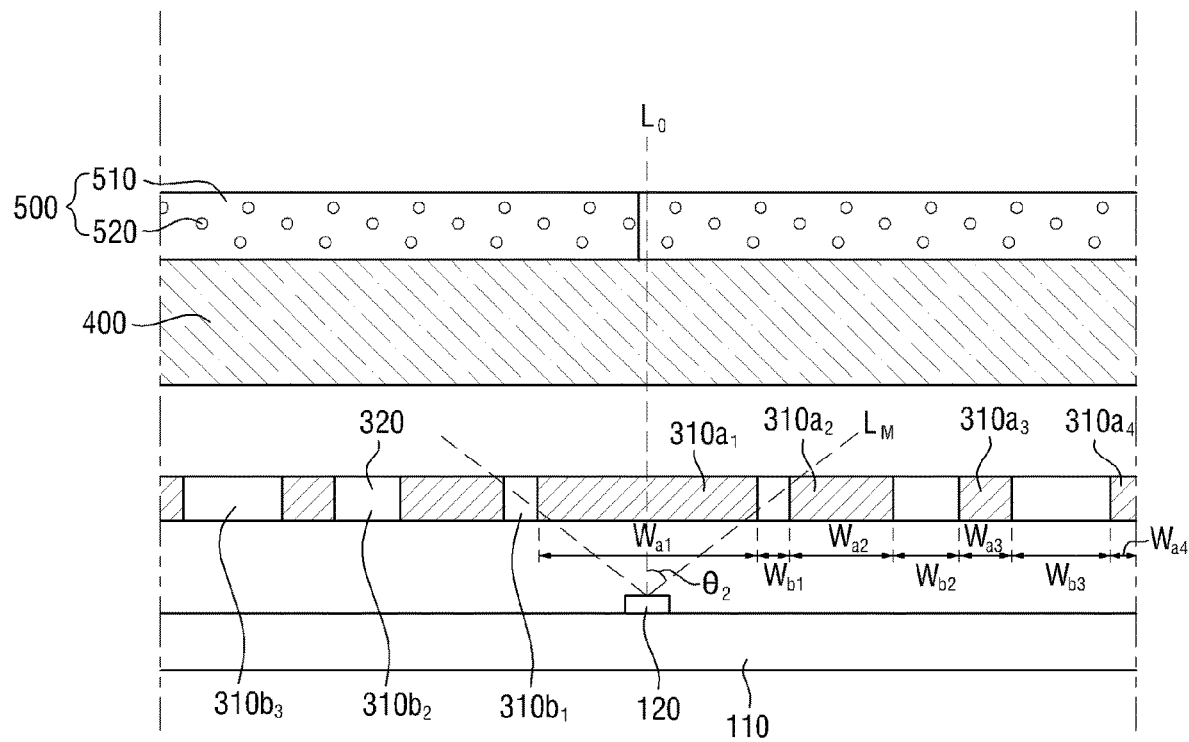
FIG. 5 is an enlarged view illustrating a light source member, a light transmission adjustment layer, a diffusion plate, and a wavelength conversion film corresponding to one light source in the schematic cross-sectional view of FIG. 4.

FIG. 4 is a schematic cross-sectional view showing a light source member, a support frame, a light transmission adjustment layer, a diffusion plate, and a wavelength conversion film according to an embodiment. FIG. 5 is an enlarged view illustrating a light source member, a light transmission adjustment layer, and a diffusion plate corresponding to one light source in the schematic cross-sectional view of FIG. 4. FIG. 6 is a schematic cross-sectional view of an opening and a light reflection layer of a light transmission adjustment layer according to an embodiment.

Referring to FIGS. 4 and 5, a light source member 100 may include a substrate 110 and light sources 120 disposed on the substrate 110.

The substrate 110 may be an insulated board or a circuit board, for example. When the substrate 110 is an insulated board, the substrate 110 may contain a transparent material such as glass or quartz or may contain a polymer material such as polyimide. When the substrate 110 is an insulating substrate, the light source member 100 may include a circuit device layer (not shown) for driving the light sources 120. The circuit device layer may be formed on one surface of the insulated board and may be formed as a printed circuit board or the like and thus attached or fastened to one surface of the insulating substrate. When the substrate 110 is a circuit board, the substrate 110 may be formed as a printed circuit board (PCB). When the substrate 110 is a PCB, the light sources 120 mounted on the substrate 110 may be electrically connected to each other.

The substrate 110 may have a planar shape substantially similar to that of the display panel 70. For example, when the display panel 70 has a rectangular planar shape, the substrate 110 may have a rectangular planar shape substantially similar to that of the display panel 70. The substrate 110 may have substantially the same size as the display panel 70 when viewed from the top down, but the disclosure is not limited thereto.

The light sources 120 may be disposed on one surface of the substrate 110. Each of the light sources 120 may include, but is not limited to, a light-emitting diode (LED). A diffusion lens or the like may be disposed on each of the light sources 120. However, the LED may be directly exposed without a separate lens, as shown in FIG. 4. The light emission of the light sources 120 may be mostly directed upward in FIG. 4.

The light sources 120 may emit light having a specific wavelength band. For example, the light sources 120 may emit blue light having a wavelength band in a range from about 420 nm to about 470 nm. In some embodiments, the light sources 120 may emit light having two or more peak wavelengths. For example, the light sources 120 may emit near-ultraviolet light and blue light. In the following description, it will be assumed that the light emitted by the light sources 120 is blue light having a wavelength band in a range from about 420 nm to about 470 nm. However, it will be apparent that the following description may be similarly applied to a case where the wavelength band of the light emitted by the light sources 120 is different from that described above.

The support frame 200 may be disposed on one surface of the substrate 110 where the light source 120 is not disposed. The support frame 200 may serve to fasten the substrate 110 and the light transmission adjustment layer 300.

The support frame 200 may include an upper surface, a lower surface, and a side surface. Each of the upper surface and the lower surface of the support frame 200 may be located in one plane. The plane where the upper surface is located and the plane where the lower surface is located may be substantially parallel to each other and may have an overall uniform thickness. Accordingly, the height of the support frame 200 (for example, the distance from the upper surface of the substrate 110 to the upper surface of the support frame 200) may be greater than the height of the light sources 120 (for example, the distance from the upper surface of the substrate 110 to an upper surface of the light source 120). Accordingly, the support frame 200 may allow the light source 120 and the light transmission adjustment layer 300 to be spaced apart from and fastened to each other.

Although not shown, a first adhesive layer may be disposed between the lower surface of the support frame 200 and the upper surface of the substrate 110 of the light source member 100 to fasten the support frame 200 and the substrate 110 to each other. A second adhesive layer may be disposed between the upper surface of the support frame 200 and the lower surface of the light transmission adjustment layer 300 to fasten the support frame 200 and the light transmission adjustment layer 300. The first adhesive layer may include a double-sided tape, a glue, an adhesive, or a combination thereof. Likewise, the second adhesive layer may include a double-sided tape, a glue, an adhesive, or a combination thereof. The first adhesive layer and the second adhesive layer may be made of the same material, but the disclosure is not limited thereto.

By the support frame 200 fastening the light transmission adjustment layer 300 and the substrate 110 of the light source member 100, it may be possible to prevent the light sources 120 from deviating from the patterns of the openings 310b of the light transmission adjustment layer 300 corresponding to the light sources 120.

The support frame 200 may contain a heat resistant plastic. However, the disclosure is not limited thereto, and the support frame 200 may contain a reflective material. The support frame 200 may be formed of a material containing metal such as, for example, silver (Ag), copper (Cu), aluminum (Al), nickel (Ni), lanthanum (La), titanium oxide (TiO), or alloys thereof or a material containing a composition such as indium tin oxide (ITO), indium zinc oxide (IZO), and indium tin-zinc oxide (ITZO), but the disclosure is not limited thereto.

When the support frame 200 contains a reflective material, the support frame 200 may serve to change the traveling direction of laterally leaking light out of the light emitted from the light sources 120, to an upper side where the light transmission adjustment layer 300 is located.

The side surface of the support frame 200 may face the light sources 120. In an embodiment, the plane where the side surface of the support frame 200 is located may be inclined to the plane where the upper surface of the support frame 200 is located and/or the plane where the lower surface of the support frame 200 is located at a predetermined angle. The upper surface of the support frame 200 may have a smaller width than the lower surface of the support frame 200. By forming the side surface of the support frame 200 to be inclined to the upper surface of the substrate 110 at a predetermined angle, the incident angle of light traveling toward the side surface of the support frame 200 may increase when the side surface of the support frame 200 is substantially perpendicular to the upper surface of the substrate 110. Accordingly, the incident region of light reflected from the side surface of the support frame 200 and traveling toward the light transmission adjustment layer 300 may be widened by the support frame 200.

The light transmission adjustment layer 300 may include a light reflection layer 310, openings 310b, and a light absorption layer 320 disposed in the openings 310b. The light reflection layer 310, the plurality of openings 310b, and the light absorption layer 320 may be integrated to form the light transmission adjustment layer 300.

Figure 6:
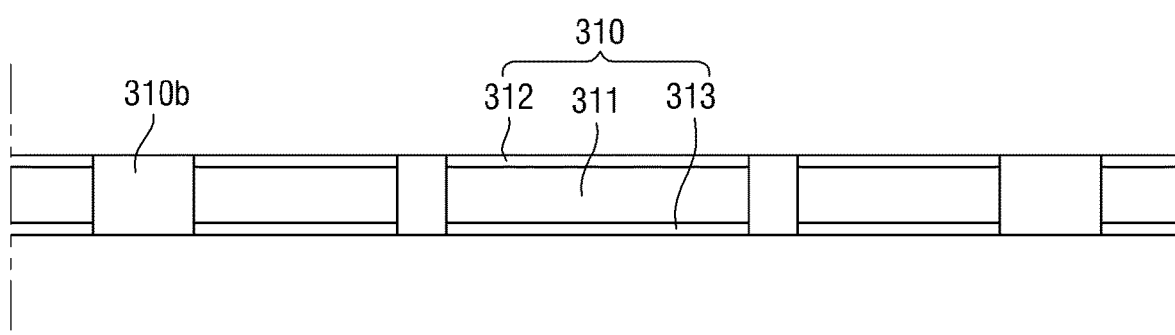
FIG. 6 is a schematic cross-sectional view of an opening and a light reflection layer of a light transmission adjustment layer according to an embodiment.

Referring to FIG. 6, the light reflection layer 310 may include a first reflective layer 312, a base layer 311, and a second reflective layer 313. The first reflective layer 312, the base layer 311, and the second reflective layer 313 may be integrated to form the light reflection layer 310. However, the disclosure is not limited thereto, and the light reflection layer 310 may have upper and lower surfaces formed of a reflective film or sheet.

The base layer 311 may be made of a plastic substrate such as polyethylene terephthalate (PET), polycarbonate (PC), polyimide (PI), or the like. The first reflective layer 312 may be disposed on an upper surface of the base layer 311. The first reflective layer 312 may be made of a reflective material. The second reflective layer 313 may be disposed on a lower surface of the base layer 311. The materials of the first reflective layer 312 and the second reflective layer 313 are not particularly limited as long as they have reflective properties, and may include at least one of a porous resin sheet, titanium oxide (TiO), or a combination thereof.

An upper surface of the first reflective layer 312 may form the upper surface of the light reflection layer 310, and a lower surface of the second reflective layer 313 may form the lower surface of the light reflection layer 310. The lower surface of the light reflection layer 310 may face the upper surface of the light source 120, and the upper surface of the light reflection layer 310 may face a lower surface of the diffusion plate 400. Accordingly, the light reflection layer 310 may reflect at least a portion of light incident on the light transmission adjustment layer 300 from the upper side and/or the lower side of the light transmission adjustment layer 300.

A traveling path of light incident on the lower surface of the light transmission adjustment layer 300 from the lower side of the light transmission adjustment layer 300 and/or a traveling path of light incident on the upper surface of the light transmission adjustment layer 300 from the upper side of the light transmission adjustment layer 300 will be described below in detail.

Referring to FIGS. 4 and 5 again, the light absorption layer 320 may include patterned light absorption layers 320. The light absorption layers 320 forming the light absorption layer 320 may be disposed in the openings 310b. The light absorption layer 320 may be disposed to fill the openings 310b. The light absorption layer 320 may be disposed in the light transmission region TA of the light transmission adjustment layer 300. However, the disclosure is not limited thereto, and the light absorption layer 320 may be disposed in at least a portion of the light reflection region RA of the light transmission adjustment layer 300.

In this embodiment, the patterned light absorption layers 320 forming the light absorption layer 320 may have substantially the same shape and/or size as the patterned openings 310b. Accordingly, when the shape of the openings 310b is substantially cylindrical, the shape of the light absorption layers 320 may also be substantially cylindrical. Also, the upper and lower surfaces of the light absorption layers 320 may be substantially circular and substantially equal in size, and the height of the light absorption layer 320 may be substantially the same as the height of the light reflection layer 310. Accordingly, the upper surface of the light absorption layer 320 may be coplanar with the upper surface of the light reflection layer 310, and the lower surface of the light absorption layer 320 may be coplanar with the lower surface of the light reflection layer 310.

The light absorption layer 320 may contain a light absorption material. The light absorption material is not particularly limited as long as it absorbs light in a particular wavelength band. The light absorption material contained in the light absorption layer 320 may transmit some light incident on the light absorption layer 320 and reflect the other light. Accordingly, the light absorption layer 320 serves to transmit light of a certain wavelength and absorbs light of the other wavelengths. The light absorption layer 320 selectively transmits or reflects incident light depending on the wavelength band of the light. Accordingly, the light absorptivity of the light absorption layer 320 may vary depending on the wavelength band of the light. For example, the light absorption layer 320 may transmit light in a first wavelength band and may absorb light having a second wavelength band different from the first wavelength band.

The diffusion plate 400 may be disposed on the light transmission adjustment layer 300. The diffusion plate 400 may have a planar shape substantially similar to that of the display panel 70. For example, when the display panel 70 has a rectangular planar shape, the diffusion plate 400 may also have a rectangular planar shape similar to that of the display panel 70. The diffusion plate 400 may have substantially the same size as the display panel 70 when viewed from the top down, but the disclosure is not limited thereto.

The diffusion plate 400 may be spaced apart from and disposed above the light transmission adjustment layer 300. The distance in the third direction Z from the upper surface of the substrate 110 of the light source member 100 to the lower surface of the diffusion plate 400 may be defined as an optical distance OD. In an embodiment, the optical distance OD may be smaller than or equal to the distance Rx in the first direction X between adjacent light sources 120. In an embodiment, the distance Rx in the first direction X between adjacent light sources 120 may range from about 10 mm to about 100 mm, and the optical distance OD may range from about 1 mm to about 3.5 mm. However, the disclosure is not limited thereto, and the distance Rx in the first direction X between adjacent light sources 120 may be different from the optical distance OD.

The wavelength conversion film 500 disposed on the diffusion plate 400 may include a binder layer 510 and wavelength conversion particles 520 dispersed in the binder layer 510. The wavelength conversion film 500 may include scattering particles dispersed in the binder layer 510 in addition to the wavelength conversion particles 520.

The binder layer 510 may be a medium in which the wavelength conversion particles 520 are dispersed and may be made of various resin compositions. However, the disclosure is not limited thereto, and any medium may be referred to as the binder layer 510 regardless of its name, additional other functions, constituents, and the like as long as it is capable of dispersing the wavelength conversion particles 520 and/or the scattering particles.

The wavelength conversion particles 520 may be particles for converting the wavelength of incident light and may include a quantum dot QD, a fluorescent material, or a phosphorescent material. However, the wavelength conversion particles 520 are not limited to the above, and may include any materials capable of converting the wavelength of incident light.

The fluorescent material may be organic phosphors or inorganic phosphors. In an embodiment, the fluorescent material may be a yellow phosphor. The yellow phosphor may be a YAG-based fluorescent material, a silicate-based fluorescent material, an oxynitride-based fluorescent material, or a combination thereof, but the disclosure is not limited thereto.

The quantum dot QD is a material having a crystal structure having a size of several nanometers and is composed of hundreds to thousands of atoms. Due to its small size, the quantum confinement effect in which an energy bandgap increases may be observable. When light of a wavelength higher in energy than the bandgap is incident on the quantum dot QD, the quantum dot QD may be excited by absorbing the light and may fall to the ground state by emitting light of a specific wavelength. The emitted light of the specific wavelength has a value corresponding to the bandgap. By adjusting the size, composition, and the like of the quantum dot QD, light emission characteristics may be adjusted through the quantum confinement effect.

The quantum dot may include at least one of, for example, group II-VI compounds, group II-V compounds, group III-VI compounds, group III-V compounds, group IV-VI compounds, group compounds, group II-IV-VI compounds, and group II-IV-V compounds.

The quantum dot may include a core and a shell overcoating the core. The core may include, but is not limited to, at least one of, for example, CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, $Fe_2O_3$, $Fe_3O_4$, Si, and Ge. The shell may include, but is not limited to, at least one of, for example, ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, Pb Se, and PbTe.

The wavelength conversion particles 520 may include at least one type of wavelength conversion particles 520 that convert incident light to have different wavelengths. The wavelength conversion particles 520 may include first wavelength conversion particles for converting a specific wavelength of incident light into a first wavelength and then emitting the light. For example, light emitted from the light source 120 and incident on the first wavelength conversion particles may be blue wavelength light, and light of the first wavelength may be yellow wavelength light. The blue wavelength may be a wavelength having a peak in the range from about 420 nm to about 470 nm, and the yellow wavelength may be a wavelength having a peak in the range from about 550 nm to about 600 nm. However, the disclosure is not limited thereto, and the wavelength conversion particles 520 may include first wavelength conversion particles for converting a specific wavelength of incident light into a first wavelength and then emitting the light and second wavelength conversion particles for converting a specific wavelength of incident light into a second wavelength and then emitting the light. For example, light emitted from the light source 120 and incident on the wavelength conversion particles may be blue wavelength light, the first wavelength may be a green wavelength, and the second wavelength may be a red wavelength. The green wavelength may be a wavelength having a peak in the range from about 520 nm to about 570 nm, and the red wavelength may be a wavelength having a peak in the range from about 620 nm to about 670 nm. However, the blue, green, red, and yellow wavelengths are not limited to the above examples, and should be understood to include all wavelength ranges that can be recognized as blue, green, red, and yellow in the art.

In an embodiment, while blue light incident on the wavelength conversion film 500 passes through the wavelength conversion film 500, a portion of the light may be incident on the wavelength conversion particles 520, converted into yellow wavelength light, and then emitted, and the other portion of the light may be emitted as it is without being incident on the wavelength conversion particles 520. Accordingly, the light having passed through the wavelength conversion film 500 may include both of the blue wavelength light and the yellow wavelength light.

A path of light being emitted by the light source 120 and traveling toward the light transmission adjustment layer 300, the diffusion plate 400, and the wavelength conversion film 500 will be described below with reference to FIGS. 4 and 5.

In an embodiment, the light source 120 may emit light from the upper surface of the light source 120. The light emitted by the light source 120 may mostly travel in the third direction Z from the upper surface of the light source 120. A portion of the light emitted by the light source 120 may travel in the third direction Z at a predetermined angle with respect to the plane in which the upper surface of the light source 120 is located.

The light reflection layer 310 of the light transmission adjustment layer 300 may be disposed above the light source 120. The light reflection layer 310 may completely cover the light source 120 in the thickness direction. At least a portion of the light emitted by the light source 120 may be incident on the light reflection layer 310 disposed above the light source 120. At least a portion of the light emitted by the light source 120 and incident on the light reflection layer 310 may be reflected toward the substrate 110.

At least a portion of the light reflected by the light reflection layer 310 and incident on the substrate 110 may be reflected again to re-enter the light reflection layer 310 or the light absorption layer 320. At least a portion of the light reflected by the substrate 110 to re-enter the light reflection layer 310 may be reflected toward the substrate 110 again. At least a portion of the light reflected by the substrate 110 to re-enter the light absorption layer 320 may be transmitted and incident on the diffusion plate 400. The relationship among the material forming the light absorption layer 320, the light emitted by the light source 120, and light converted and emitted by the wavelength conversion film 500 will be described below.

The light incident on the diffusion plate 400 through the light absorption layer 320 may be diffused toward the wavelength conversion film 500 through the diffusion plate 400.

A path of light being emitted by the diffusion plate 400 and incident on the wavelength conversion film 500 may have a different length depending on an incident angle at which the light is incident on the wavelength conversion film 500. When the incident angle of the light incident on the wavelength conversion film 500 is a first incident angle $\theta_1$ and the wavelength conversion film 500 has a given thickness d, the length l of a straight path of the light being incident on the wavelength conversion film 500 and passing through the wavelength conversion film 500 may be d/cos θ1. Accordingly, the value of cos $\theta_1$ decreases as the first incident angle $\theta_1$ increases. Thus, the length l of the straight path of the light traveling through the wavelength conversion film 500 may increase.

For example, it may be assumed that the length of the straight path of the light passing through the wavelength conversion film 500 is $l_a$ when the first incident angle $\theta_1$ at which the light emitted by the diffusion plate 400 is incident on the wavelength conversion film 500 is $\theta_{1a}$ and is $l_b$ when the first incident angle $\theta_1$ is $\theta_{1b}$. In this case, $l_a$ may be smaller than $l_b$ because $\theta_{1b}$ is greater than $\theta_1 a$. Accordingly, when the first incident angle $\theta_1$ is great, the length of the straight path of the light passing through the wavelength conversion film 500 increases. Thus, the probability that blue light emitted from the diffusion plate 400 will be incident on the wavelength conversion particles 520 of the wavelength conversion film 500 may be increased. Accordingly, a relatively large amount of blue light may pass through the center of the unit light source region CE where the light source 120 is disposed. The wavelength of blue light is converted by the wavelength conversion particles 520 outwardly from the center of the unit light source region CE, and thus a larger amount of yellow light may be emitted. Accordingly, chrominance may be higher in an outer region spaced away from the light source 120 than at a central region.

By decreasing yellow wavelength light in the outer region of the light source 120 in order to reduce the difference in chrominance between the central region at which the light source 120 is disposed and the outer region, it is possible to improve color reproducibility. Accordingly, the material forming the light absorption layer 320 may have characteristics of transmitting light emitted by the light source 120 and absorbing light having a wavelength band converted by the wavelength conversion film 500 and incident on the light absorption layer 320. In an embodiment, the light absorption layer 320 may be made of a material capable of transmitting blue light and absorbing yellow light converted in wavelength by the wavelength conversion film 500 and incident on the light absorption layer 320. For example, the light absorption layer 320 may be made of a blue pigment. A blue pigment has a complementary color of yellow and may transmit blue light and absorb yellow light. For example, the light absorption material contained in the light absorption layer 320 may include a material capable of transmitting light of a first wavelength band, the light emitted by the light source 120 and absorbing light of a second wavelength band which is different from the first wavelength band and is converted by the wavelength conversion particles 520 of the wavelength conversion film 500.

By absorbing yellow light out of light incident on the light transmission adjustment layer 300 from the wavelength conversion film 500, the light absorption layer 320 may serve to reduce the luminance of the yellow light and improve the uniformity of chrominance regardless of regions of the display panel 70.

Even though the optical distance OD is reduced, in order to increase color reproducibility by maximizing improvement of luminance uniformity and reducing chrominance between the center of the unit light source region CE at which the light source 120 is disposed and the outer region, it is preferable that the arrangement relationship between the pattern of the light transmission adjustment layer 300 and the light source 120 is appropriately set.

The arrangement of the pattern of the light transmission adjustment layer 300 and the individual light source 120 for improving luminance uniformity and color reproducibility will be described below in detail with reference to FIG. 5.

The light source 120 may emit light from the center of the upper surface of the light source 120. The light emitted by the light source 120 may have an optical path in an oriented angle range of the light source 120. In an embodiment, the oriented angle of the light source 120 may be about 120°.

In detail, when a reference line $L_0$ passing through the center of the light source 120 in the third direction Z is defined, a traveling path of the light emitted by the light source 120 may form a second angle $\theta_2$, which is an acute angle, along with the reference line $L_0$. In an embodiment, the second angle $\theta_2$ formed by the traveling path of the light emitted by the light source 120 and the reference line $L_0$ may be smaller than or equal to about 60°. For example, the maximal value of the second angle $\theta_2$ formed by the traveling path of the light emitted by the light source 120 and the reference line $L_0$ may be about 60°.

In an embodiment, the light reflection layer 310 corresponding to one light source 120 may include a first light reflection layer $310a_1$, a second light reflection layer $310a_2$, a third light reflection layer $310a_3$, and a fourth light reflection layer $310a_4$ in a sequence outwardly from the center of the unit light source region CE. The first light reflection layer $310a_1$ may be a portion of the light reflection layer 310 overlapped with the light source 120 in the thickness direction.

The traveling path of the light emitted by the light source 120 is defined as a reference path line $L_M$ when the second angle $\theta_2$ formed by the traveling path of the light and the reference line $L_0$ is maximal. In this case, the light emitted by the light source 120 may mostly travel between the reference line $L_0$ and the reference path line $L_M$. The reference path line $L_M$ having the maximal angle with respect to the reference line $L_0$ may pass through the first light reflection layer $310a_1$ overlapped with the light source 120 in the third direction Z.

Accordingly, placing a point at which the plane where a lower surface of the first light reflection layer $310a_1$ is located meets the reference path line $L_M$ to the inside of the first light reflection layer $310a_1$ may be advantageous for the light emitted by the light source 120 to be incident on the first light reflection layer $310a_1$. For example, a width $Wa_1$ of the first light reflection layer $310a_1$ may be formed to be greater than the distance between two points at which the plane where the lower surface of the first light reflection layer $310a_1$ is located meets two reference path lines $L_M$. Accordingly, the light emitted by the light source 120 may be incident on and reflected by the first light reflection layer $310a_1$. Thus, it is possible to prevent light from being concentrated on only the region where the light source 120 is disposed.

The light reflection layers $310a_1$, $310a_2$, $310a_3$, and $310a_4$ may have different widths depending on the distance from the light source 120. The widths of the light reflection layers $310a_1$, $310a_2$, $310a_3$, and $310a_4$ may decrease as the distance from the light source 120 increases. For example, when the widths of the first light reflection layer $310a_1$, the second light reflection layer $310a_2$, the third light reflection layer $310a_3$, and the fourth light reflection layer $310a_4$ are represented by $Wa_1$, $Wa_2$, $Wa_3$, and $Wa_4$, respectively, the width $Wa_1$ may be largest, and the width $Wa_4$ may be smallest. Accordingly, the amount of reflected light out of the light emitted by the light source 120 may decrease outwardly from the light source 120. Thus, the amount of light transmitted from the light source 120 toward the display panel 70 may be adjusted according to the distance.

The light absorption layer 320 disposed in the openings 310b and having the same pattern as the openings 310b may adjust the reflectivity of yellow light that is incident on the light transmission adjustment layer 300 while having a wavelength converted by the wavelength conversion film 500. Accordingly, by placing the area of the light absorption layer 320 to be relatively wide in the outer region where a relatively large amount of yellow light is emitted, it is possible to decrease the amount of yellow light incident on the display panel 70 in the outer region.

Accordingly, the widths of the openings 310b in which the light absorption layer 320 is to be disposed may be formed to increase outwardly. The openings 310b disposed to correspond to the light source 120 disposed in one unit light source region CE may include a first opening $310b_1$, a second opening $310b_2$, and a third opening $310b_3$. The first opening $310b_1$ may be an opening closest to the light source 120, and the third opening $310b_3$ may be an opening farthest from the light source 120.

The openings $310b_1$, $310b_2$, and $310b_3$ may have different widths depending on the distance from the light source 120. The widths of the openings $310b_1$, $310b_2$, and $310b_3$ may increase as the distance from the light source 120 increases. For example, when the widths of the first opening $310b_1$, the second opening $310b_2$, and the third opening $310b_3$ are represented by $Wb_1$, $Wb_2$, and $Wb_3$, respectively, the width $Wb_1$ may be smallest, and the width $Wb_3$ may be largest. Accordingly, the amount of transmitted light out of the light emitted by the light source 120 may increase outwardly from the light source 120. Thus, the amount of reflected yellow light and the amount of blue light transmitted from the light source 120 toward the display panel 70 may be adjusted according to the distance.

Figure 7:
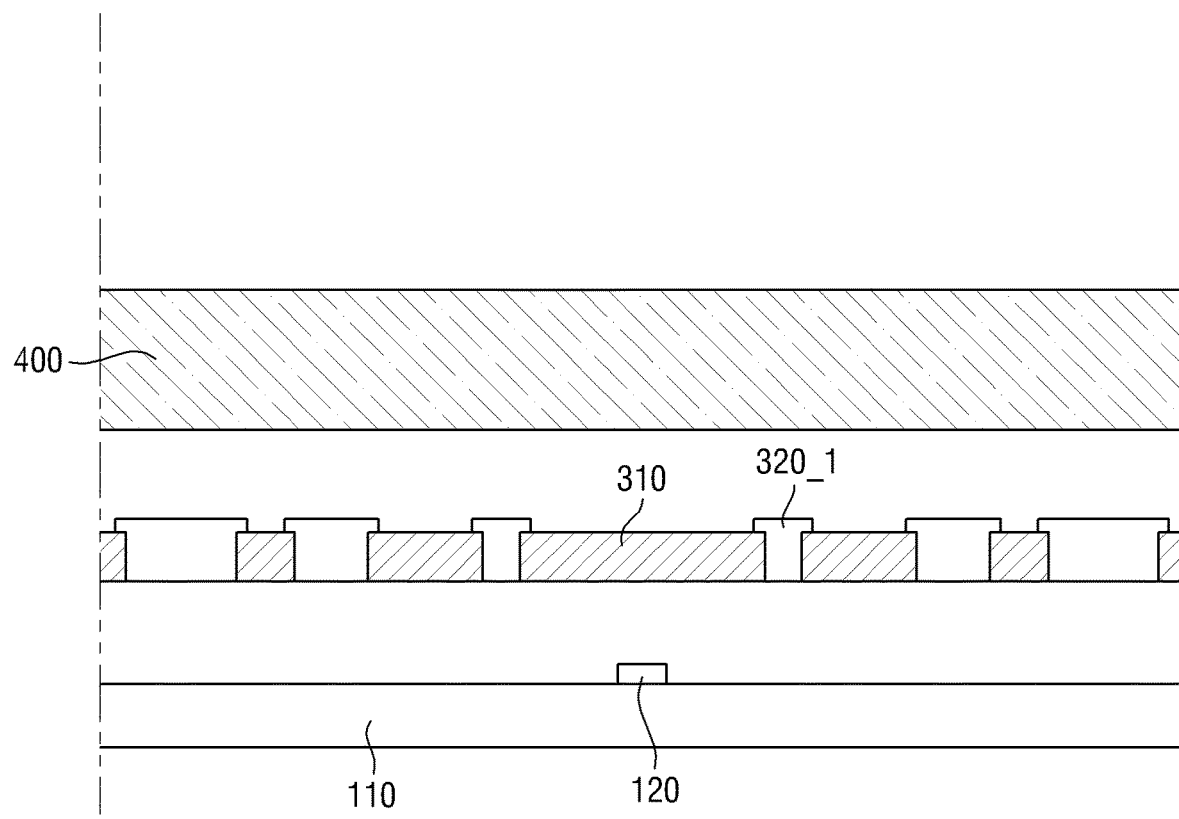
FIG. 7 is a schematic cross-sectional view of a light source member, a light transmission adjustment layer, and a diffusion plate according to an embodiment.

FIG. 7 is a schematic cross-sectional view of a light source member, a light transmission adjustment layer, and a diffusion plate according to an embodiment. The embodiment of FIG. 7 is different from that of FIG. 6 in that a light absorption layer 320_1 covers a portion of an upper surface of a light reflection layer 310.

In detail, the light absorption layer 320_1 may fill the space of openings 310b of the light reflection layer 310 and extend outwardly. The light absorption layer 320_1 extending outwardly from the openings 310b may cover a portion of the upper surface of the light reflection layer 310. A lower surface of the light absorption layer 320_1 may be coplanar with a lower surface of the light reflection layer 310. As an example, the light absorption layer 320_1 may be formed in the shape of the letter "T."

The light absorption layer 320_1 may be partially overlapped with the light reflection layer 310 in the thickness direction in the region where the upper surface of the light reflection layer 310 is covered. A portion of the upper surface of the light reflection layer 310 may be covered by the light absorption layer 320_1, and at least another potion may be exposed.

In this embodiment, blue light or yellow light incident on the exposed portion of the upper surface of the light reflection layer 310 from the diffusion plate 400 may be reflected to re-enter the diffusion plate 400. The blue light incident on the light absorption layer 320_1 overlapped with the light reflection layer 310 from the diffusion plate 400 in the thickness direction may pass through the light absorption layer 320_1 and then may be incident on the light reflection layer 310 overlapped with the light absorption layer 320_1. The blue light incident on the light reflection layer 310 may be reflected by the light reflection layer 310 to re-enter the diffusion plate 400. The yellow light incident on the light absorption layer 320_1 overlapped with the light reflection layer 310 from the diffusion plate 400 in the thickness direction may be absorbed by the light absorption layer 320_1.

In this embodiment, the reflectivity and transmissivity of the blue light emitted by the light source 120 and traveling toward the diffusion plate 400 may be adjusted by the openings 310b and the light reflection layer 310 of the light transmission adjustment layer 300, and the re-reflectivity and absorptivity of the yellow light converted by the wavelength conversion film 500 and incident on the light transmission adjustment layer 300 may be adjusted by the light absorption layer 320_1. For example, by forming the upper surface of the openings 310b and the upper surface of the light absorption layer 320_1 disposed corresponding to the openings 310b such that the area of the upper surface of the openings 310b is different from that of the light absorption layer 320_1, it is possible to adjust luminance and color reproducibility independently.

Figure 8:
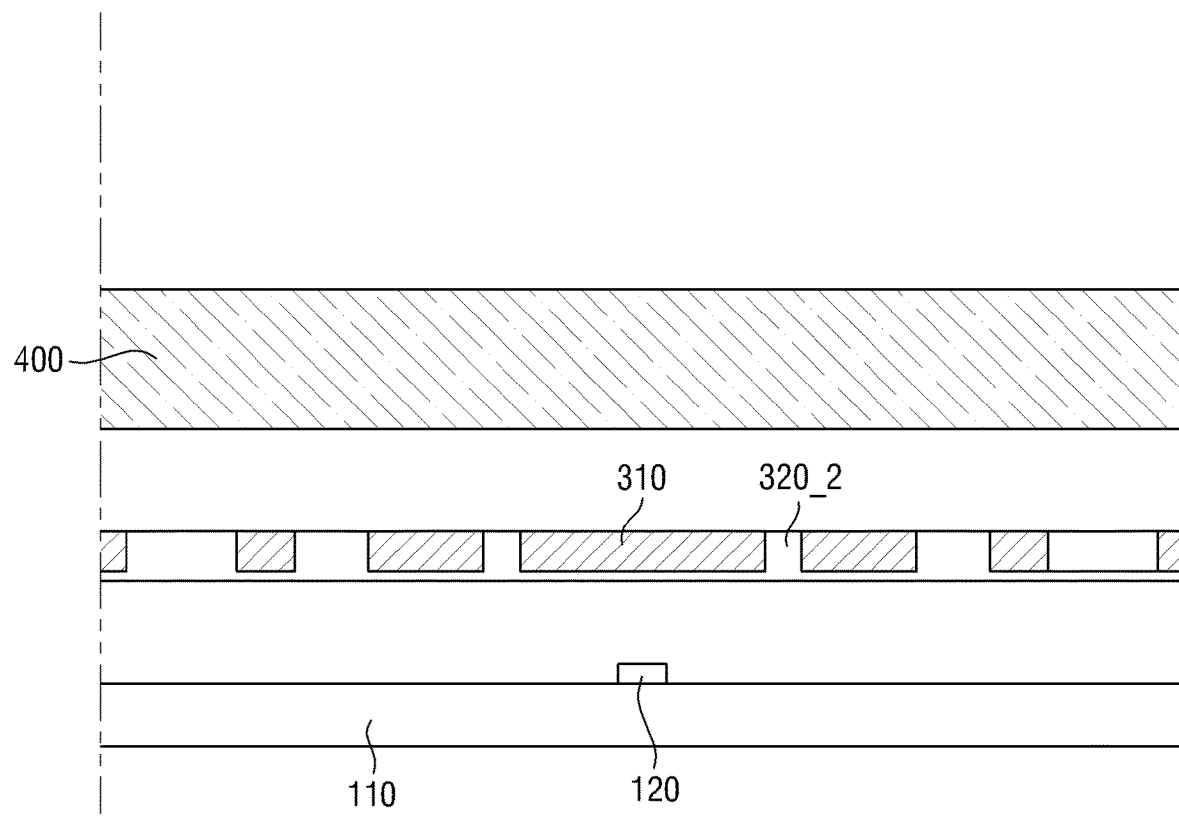
FIG. 8 is a schematic cross-sectional view of a light source member, a light transmission adjustment layer, and a diffusion plate according to an embodiment.

FIG. 8 is a sectional view of a light source member, a light transmission adjustment layer, and a diffusion plate according to an embodiment. The embodiment of FIG. 8 is different from that of FIG. 6 in that a light absorption layer 320_2 may be disposed on an entire lower surface of a light reflection layer 310.

The light absorption layer 320_2 may fill the space of openings 310b and entirely cover the lower surface of the light reflection layer 310. Accordingly, a lower surface of the light absorption layer 320_2 may form a lower surface of the light transmission adjustment layer 300. An upper surface of the light absorption layer 320_2 may be coplanar with an upper surface of the light reflection layer 310. The light absorption layer 320_2 may be entirely overlapped with the light reflection layer 310 in the thickness direction in the region where the lower surface of the light reflection layer 310 is covered.

In this embodiment, when blue light emitted by the light source 120 is incident on the light absorption layer 320_2 disposed on the lower surface of the light reflection layer 310, the blue light may be incident on the light reflection layer 310 through the light absorption layer 320_2. The blue light incident on the light reflection layer 310 may be reflected. When the blue light emitted by the light source 120 is incident on the light absorption layer 320_2 filling the openings 310b, the blue light may be emitted to the diffusion plate 400 through the light absorption layer 320_2.

In this embodiment, although the light absorption layer 320_2 is disposed on the entire lower surface of the light reflection layer 310 instead of being selectively disposed on only the openings 310a, the blue light emitted by the light source 120 and traveling toward the diffusion plate 400 may pass through the light absorption layer 320_2. Accordingly, although the light absorption layer 320_2 is not patterned and disposed during a process of producing the light transmission adjustment layer 300, the reflectivity and transmissivity of the blue light emitted by the light source 120 may be adjusted by the light reflection layer 310 and the openings 310b. Accordingly, in the method of manufacturing the light transmission adjustment layer 300, it is possible to shorten process or manufacturing time for applying the light absorption layer 320_2.

Figure 9:
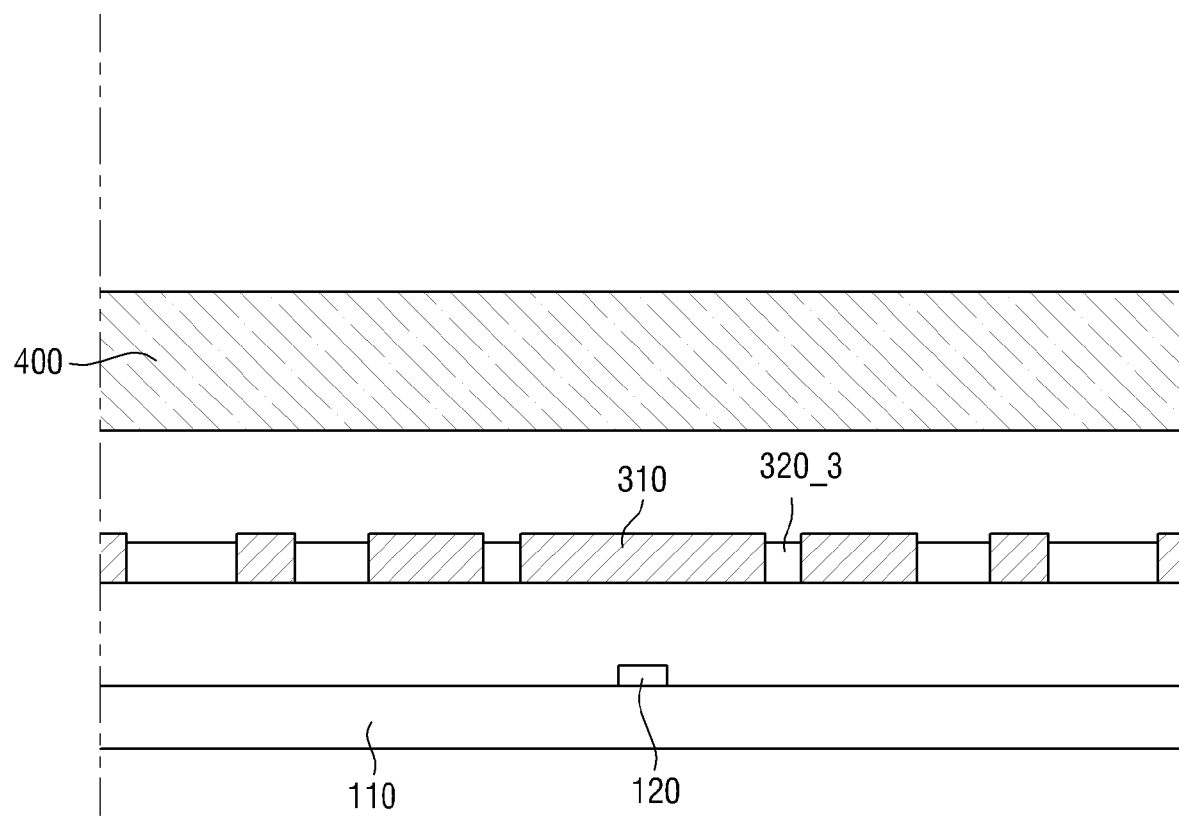
FIG. 9 is a schematic cross-sectional view of a light source member, a light transmission adjustment layer, and a diffusion plate according to an embodiment.

FIG. 9 is a schematic cross-sectional view of a light source member, a light transmission adjustment layer, and a diffusion plate according to an embodiment. The embodiment of FIG. 9 is different from that of FIG. 6 in that a light absorption layer 320_3 exposes at least a portion of the space of openings 310b.

In detail, the light absorption layer 320_3 may fill only some space of the openings 310b. For example, the shape of the light absorption layer 320_3 may be a cylinder that has upper and lower surfaces having the same area as those of the openings 310*b* corresponding to the light absorption layer 320_3 and that has a height of a sidewall that may be different from those of the openings 310*b*. The height of the sidewall of the light absorption layer 320_3 may be smaller than those of the openings 310*b*. Accordingly, the light absorption layer 320_3 may expose at least a portion of the sidewalls of the openings 310*b*. In other words, the height of the sidewall of the light absorption layer 320_3 may not be even or level with the openings 310*b*.

A lower surface of the light absorption layer 320_3 may be coplanar with a lower surface of the light reflection layer 310. The plane where an upper surface of the light reflection layer 310 is located or disposed may be located or disposed over the plane where an upper surface of the light absorption layer 320_3 is located or disposed. Accordingly, a light transmission adjustment layer 300_3 may have a lower surface which is formed to be substantially flat and an upper surface from which the light reflection layer 310 protrudes.

Figure 10:
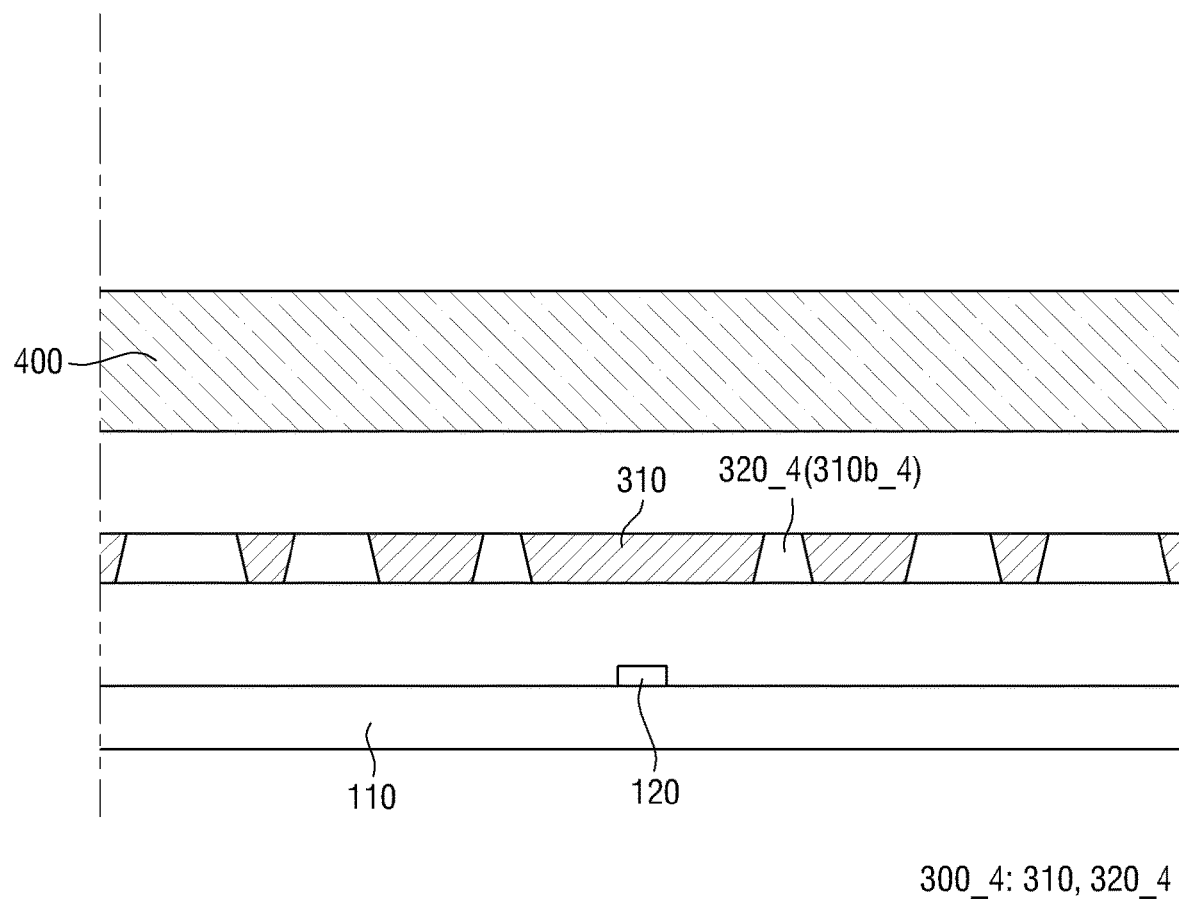
FIG. 10 is a schematic cross-sectional view of a light source member, a light transmission adjustment layer, and a diffusion plate according to an embodiment.

FIG. 10 is a schematic cross-sectional view of a light source member, a light transmission adjustment layer, and a diffusion plate according to an embodiment. The embodiment of FIG. 10 is different from that of FIG. 6 in that openings 310*b*_4 may have the shape of a truncated cone that has a lower surface and an upper surface smaller in area than the lower surface.

In detail, the openings 310*b*_4 may be formed to completely pass through the light reflection layer 310 in the thickness direction. The plane where the sidewalls of the openings 310*b*_4 are located or disposed and the plane where the upper surface of the openings 310*b*_4 is located or disposed may be inclined to each other at a predetermined angle. Accordingly, the light reflection layer 310 may have a lower surface and an upper surface larger in area than the lower surface.

A light absorption layer 320_4 filling the space of the openings 310*b*_4 may have substantially the same shape as the openings 310*b*_4. For example, when the openings 310*b*_4 have the shape of a truncated cone that has a lower surface and an upper surface smaller in area than the lower surface, the light absorption layer 320_4 may also have the shape of a truncated cone that has a lower surface and an upper surface smaller in area than the lower surface.

In this embodiment, by forming the lower surface of the light reflection layer 310 to be smaller in area than the upper surface of the light reflection layer 310, the reflectivity of light incident on a light transmission adjustment layer 300_4 from the upper side of the light transmission adjustment layer 300_4 may be adjusted to be smaller than the reflectivity of light incident on the light transmission adjustment layer 300_4 from the lower side of the light transmission adjustment layer 300_4. Accordingly, it is possible to minimize loss of light emitted by the light source 120 and incident on the display panel 70 through the light transmission adjustment layer 300_4.

Figure 11:
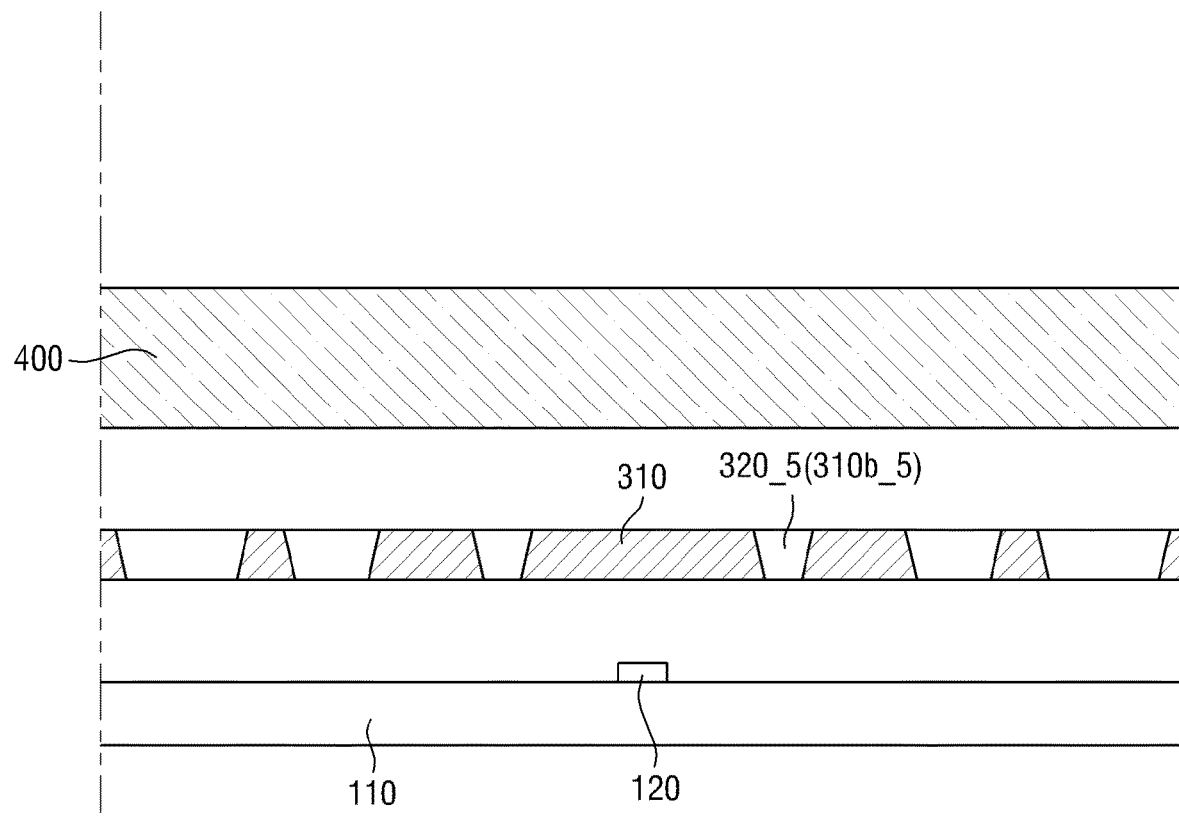
FIG. 11 is a schematic cross-sectional view of a light source member, a light transmission adjustment layer, and a diffusion plate according to an embodiment.

FIG. 11 is a sectional view of a light source member, a light transmission adjustment layer, and a diffusion plate according to an embodiment. The embodiment of FIG. 11 is different from that of FIG. 10 in that openings 310*b*_5 may have the shape of a truncated cone that has a lower surface and an upper surface larger in area than the lower surface.

In detail, the openings 310*b*_5 may be formed to completely pass through the light reflection layer 310 in the thickness direction. The plane where the sidewalls of the openings 310*b*_5 are located or disposed and the plane where the upper surface of the openings 310*b*_5 is located or disposed may be inclined to each other at a predetermined angle. Accordingly, the light reflection layer 310 may have a lower surface and an upper surface smaller in area than the lower surface.

A light absorption layer 320_5 filling the space of the openings 310*b*_5 may have substantially the same shape as the openings 310*b*_5. For example, when the openings 310*b*_5 have the shape of a truncated cone that has a lower surface and an upper surface larger in area than the lower surface, the light absorption layer 320_5 may also have the shape of a truncated cone that has a lower surface and an upper surface larger in area than the lower surface.

In this embodiment, by forming the lower surface of the light reflection layer 310 to be larger in area than the upper surface of the light reflection layer 310, the reflectivity of light incident on a light transmission adjustment layer 300_5 from the lower side of the light transmission adjustment layer 300_5 may be adjusted to be different from the reflectivity of light incident on the light transmission adjustment layer 300_5 from the upper side of the light transmission adjustment layer 300_5. For example, when the lower surface of the light reflection layer 310 is substantially larger in area than the upper surface of the light reflection layer 310, the probability that light will be incident on the light reflection layer 310 from the lower side of the light transmission adjustment layer 300_5 may be higher than the probability that light will be incident on the light reflection layer 310 from the upper side of the light transmission adjustment layer 300_5. Accordingly, the reflectivity of light emitted by the light source 120 may be adjusted to be relatively higher than the reflectivity of light incident on the wavelength conversion film 500.

In the embodiments of FIGS. 10 and 11, the reflectivity of the light incident from the upper side of the light transmission adjustment layer and the reflectivity of the light incident from the lower side of the light transmission adjustment layer may be adjusted by forming the upper surface and the lower surface of the light reflection layer such that the area of the upper surface is substantially different from that of the lower surface.

Figure 12:
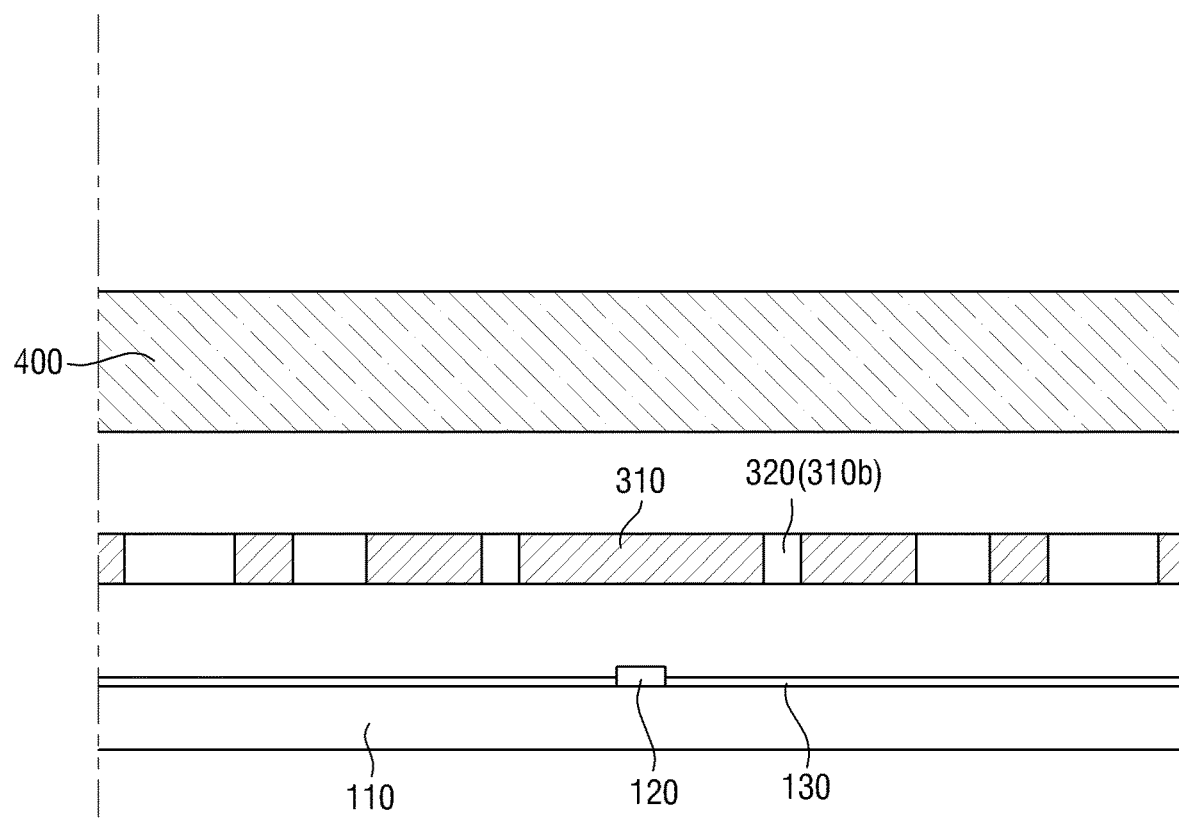
FIG. 12 is a schematic cross-sectional view of a light source member, a light transmission adjustment layer, and a diffusion plate according to an embodiment.

FIG. 12 is a schematic cross-sectional view of a light source member, a light transmission adjustment layer, and a diffusion plate according to an embodiment. The embodiment of FIG. 12 is different from that of FIG. 6 in that a light source member 100 further includes a reflective coating layer 130 disposed on an upper surface of a substrate 110.

According to this embodiment, the light source member 100 may include the reflective coating layer 130. The reflective coating layer 130 may be disposed on one surface of the substrate 110 where the light source 120 is not disposed. Although not shown, referring to FIG. 4, the reflective coating layer 130 may be disposed in a separate space of the support frame 200. The reflective coating layer 130 may be disposed to surround the light source 120 when viewed from the top down. The reflective coating layer 130 may at least partially or entirely cover one surface of the substrate 110 exposed by the light source 120. The thickness of the reflective coating layer 130 may be substantially smaller than or equal to the height of the light source 120.

The reflective coating layer 130 may serve to minimize leakage of light by reflecting, toward the light transmission adjustment layer 300, at least some light incident on the light reflection layer 310 and reflected toward the substrate 110 out of the light emitted by the light source 120 and also to vary an incident angle at which the light is incident on the light transmission adjustment layer 300.

The reflective coating layer 130 may contain a reflective material. For example, the reflective coating layer 130 may be formed of a material containing metal such as, for example, silver (Ag), copper (Cu), aluminum (Al), nickel (Ni), lanthanum (La), or alloys thereof or a material containing a composition such as indium tin oxide (ITO), indium zinc oxide (IZO), and indium tin-zinc oxide (ITZO), but the disclosure is not limited thereto.

In this embodiment, since the reflection is made by the reflective coating layer 130, the substrate 110 covered by the reflective coating layer 130 may contain a non-reflective material or a low-reflective material.

Figure 13:
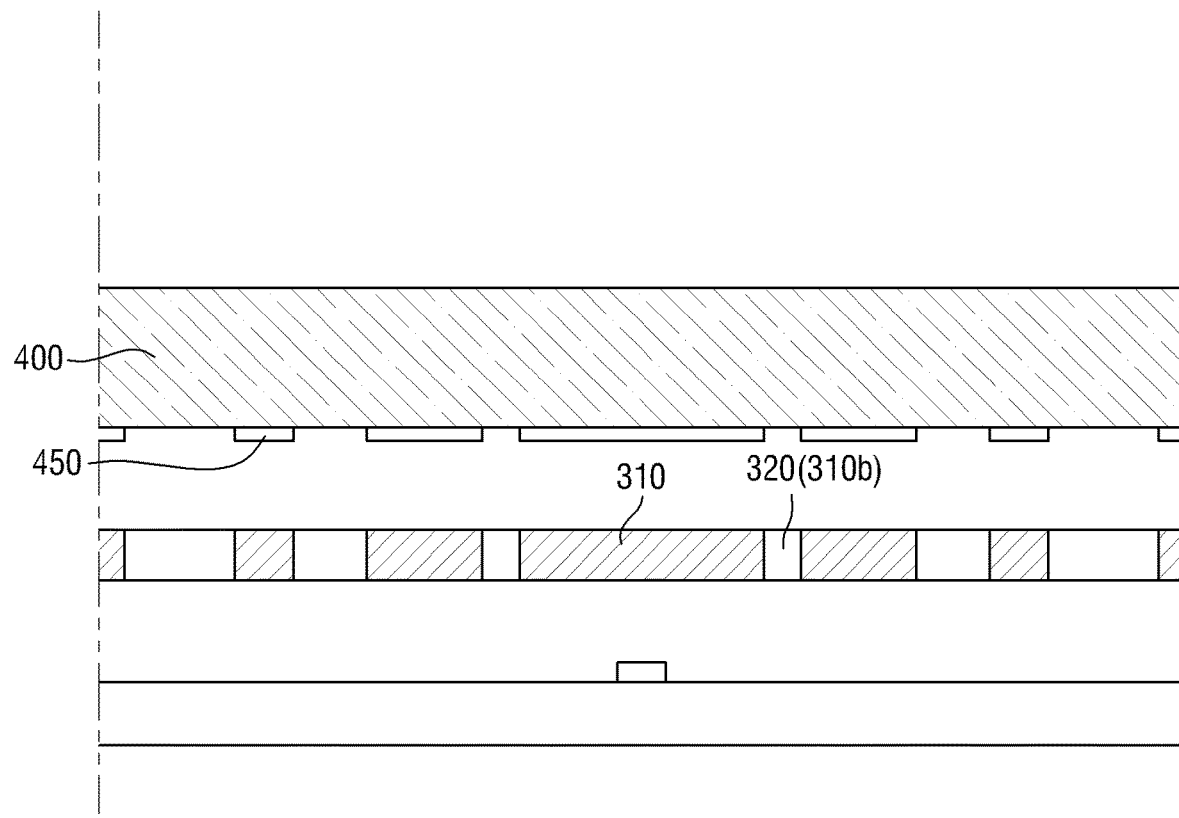
FIG. 13 is a schematic cross-sectional view of a light source member, a light transmission adjustment layer, and a diffusion plate according to an embodiment.

FIG. 13 is a schematic cross-sectional view of a light source member, a light transmission adjustment layer, and a diffusion plate according to an embodiment. The embodiment of FIG. 13 is different from that of FIG. 6 in that a reflective pattern 450 may be disposed on a lower surface of a diffusion plate 400.

In a backlight unit 10 according to this embodiment, the reflective pattern 450 may be disposed between the diffusion plate 400 and a light transmission adjustment layer 300. In an embodiment, the reflective pattern 450 may be a reflective ink pattern made of ink. However, the disclosure is not limited thereto, and the reflective pattern 450 may be formed in the shape of a film or a layer.

The reflective pattern 450 may be formed on the lower surface of the diffusion plate 400. The reflective pattern 450 may include patterned reflective layers. Reflective layers forming the reflective pattern 450 may be spaced apart from one another. The reflective layers may have different widths. However, the disclosure is not limited thereto, and the reflective layers may have substantially the same width.

The reflective pattern 450 may be formed on the diffusion plate 400 in a printing manner, but the disclosure is not limited thereto. The reflective pattern 450 may contain a reflective material, for example, metal, titanium oxide (TiO), a dichroic pigment, or the like, but the disclosure is not limited thereto.

In an embodiment, the reflective pattern 450 may be overlapped with the light reflection layer 310 of the light transmission adjustment layer 300 in the thickness direction. The reflective pattern 450 may correspond to the light reflection layer 310 in the thickness direction. The reflective pattern 450 may have a width substantially smaller than or equal to that of the corresponding light reflection layer 310. However, the disclosure is not limited thereto, and the width of the reflective pattern 450 may be formed independently from the width of the light reflection layer 310.

Such reflective patterns 450 may be spaced apart from one another in the first direction X or the second direction Y. The reflective patterns 450 may be spaced at different distances in the first direction X. In an embodiment, a reflective pattern 450 spaced a first distance from the light source 120 may be different from a reflective pattern 450 spaced a second distance from the light source 120. The second distance may be greater than the first distance. The reflective pattern 450 spaced at the first distance from the light source 120 may have a substantially smaller interval than the reflective pattern 450 spaced at the second distance from the light source 120. Accordingly, the interval of the reflective pattern 450 may substantially increase away from the corresponding light source 120.

By placing the reflective patterns 450 such that the interval between the reflective patterns 450 increases away from the corresponding light source 120, the transmissivity of the light emitted from the light source 120 to the wavelength conversion film 500 may be lowest at the center substantially perpendicular to the light source 120 in the thickness direction and may increase outwardly from the center.

The reflective pattern 450 disposed on the lower surface of the diffusion plate 400 serves to prevent most light emitted from the light source 120 from traveling vertically upward and being incident on the display panel 70. Accordingly, the reflective pattern 450 serves to provide light emitted by the light source 120 to the display panel 70 such that the light has uniform luminance.

Figure 14:
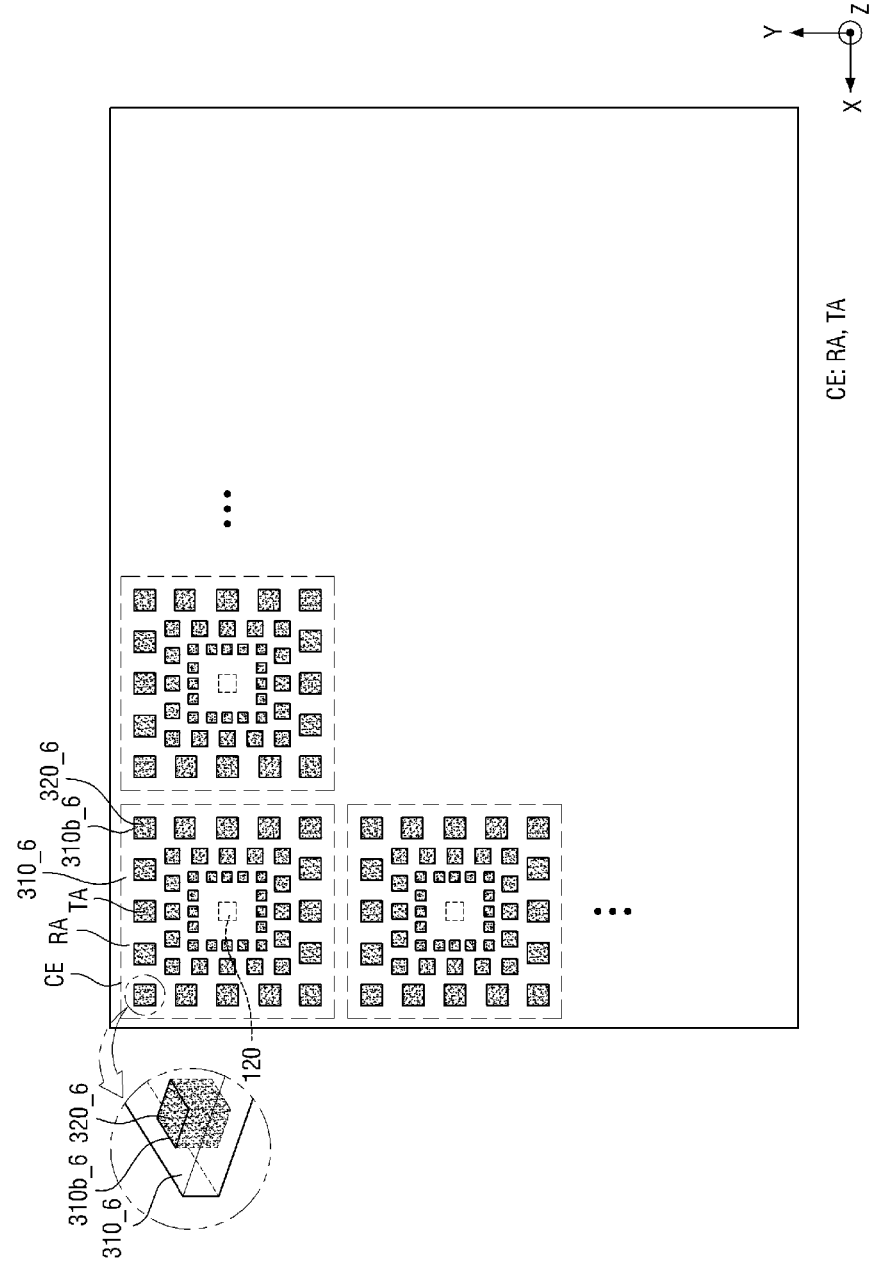
FIG. 14 is a layout diagram showing a relative positional relationship between a light transmission adjustment layer and a light source of a light source member according to an embodiment.

FIG. 14 is a layout diagram showing a relative positional relationship between a light transmission adjustment layer and a light source of a light source member according to an embodiment. The embodiment of FIG. 14 is different from that of FIG. 3 in that the openings have the shape of a substantially rectangular parallelepiped.

The planar shape of each light transmission region TA may be a square. Accordingly, openings 310b_6 disposed in the light transmission region TA may have upper and lower surfaces having a square shape when viewed from the top down. The openings 310b_6 may be formed to completely pass through the light reflection layer 310 in the thickness direction. The openings 310b_6 may have the shape of a rectangular parallelepiped. Accordingly, the upper and lower surfaces of the openings 310b may be substantially square and equal in size, and the height of the openings 310b may be substantially the same as the height of the light reflection layer 310.

Figure 15:
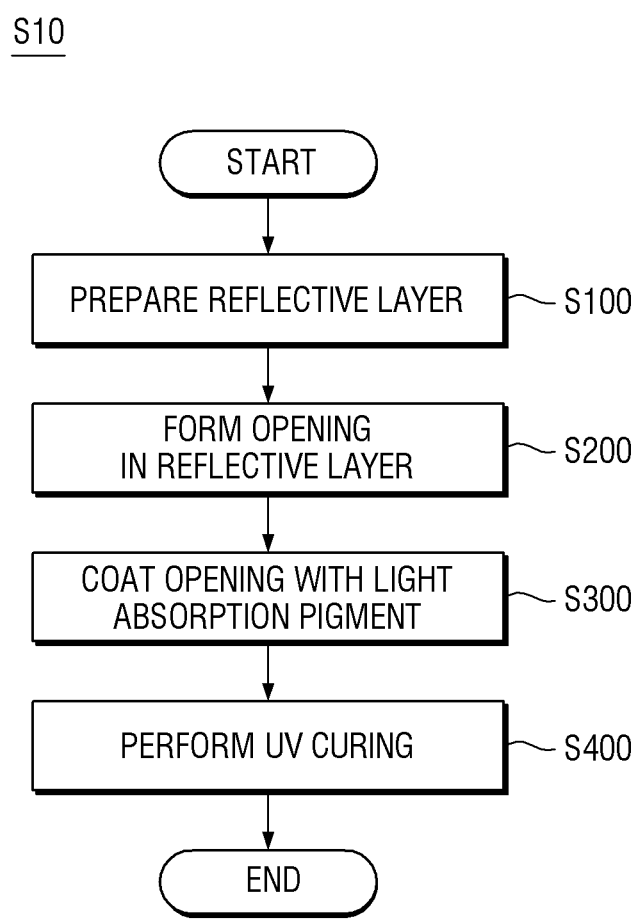
FIG. 15 is a flowchart showing a method of manufacturing a light transmission adjustment layer according to an embodiment.
Figure 16:
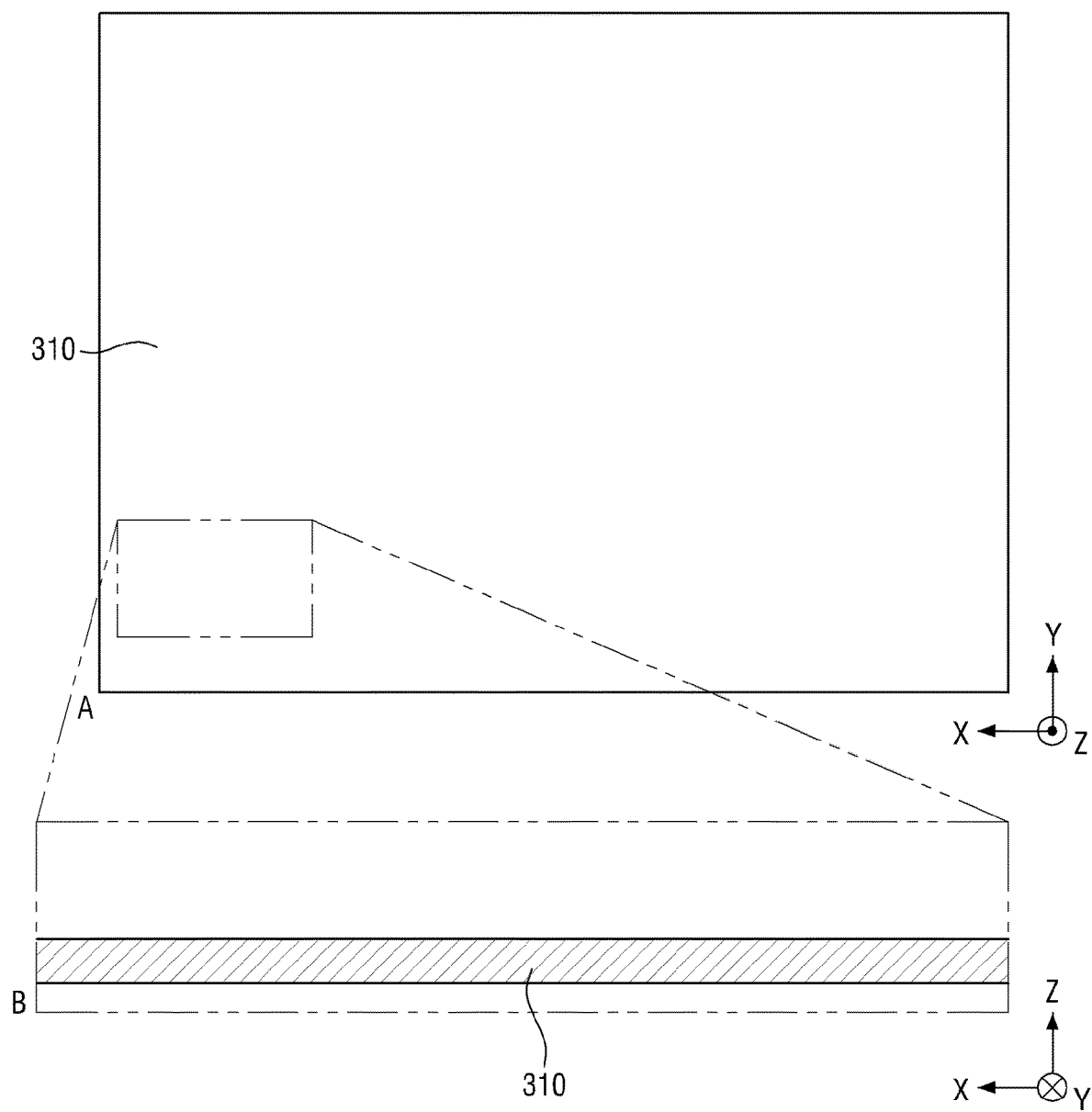
FIG. 16 is a schematic diagram showing an example of operation S100 of FIG. 15.
Figure 17:
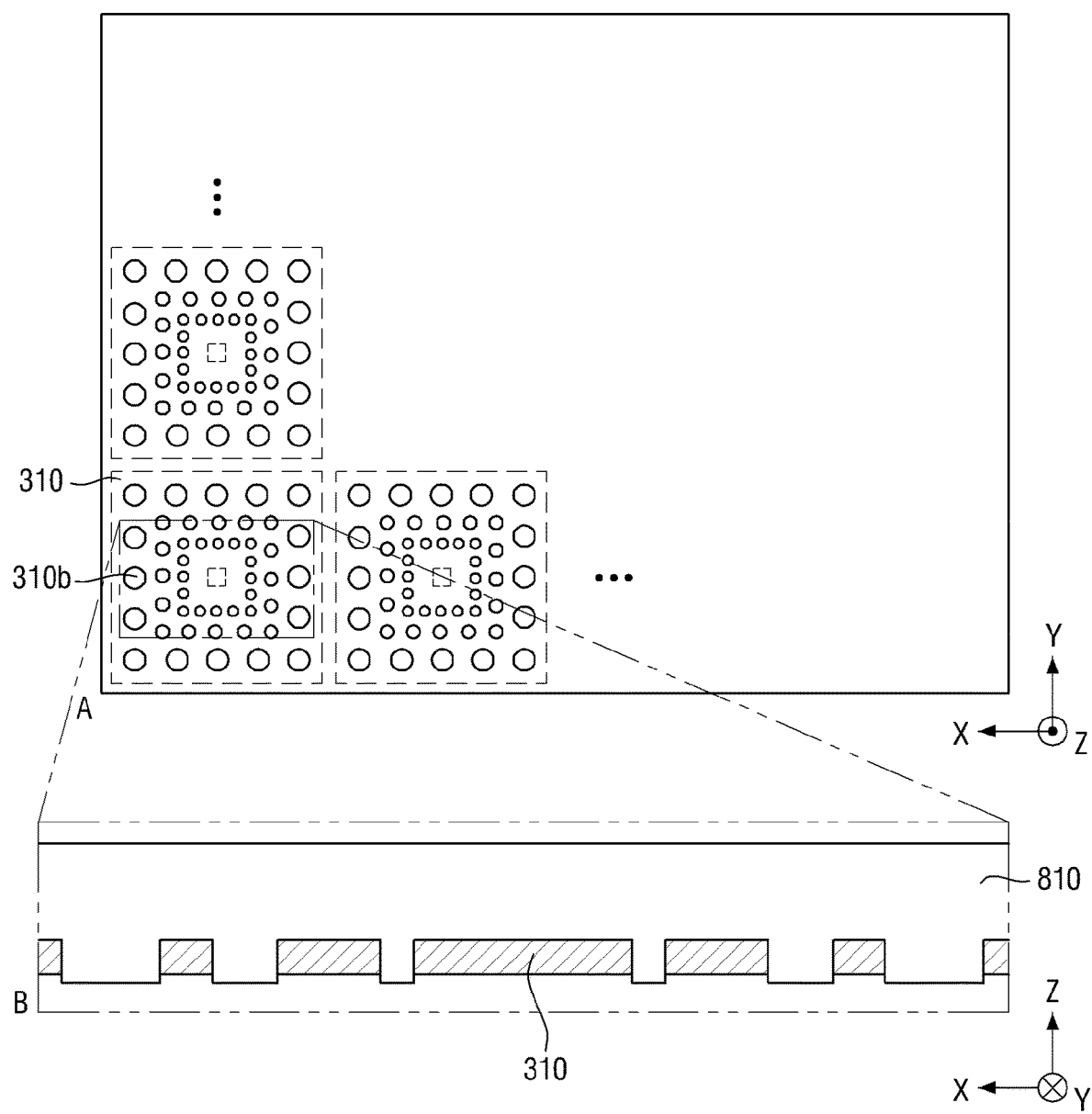
FIG. 17 is a schematic diagram showing an example of operation S200 of FIG. 15.
Figure 18:
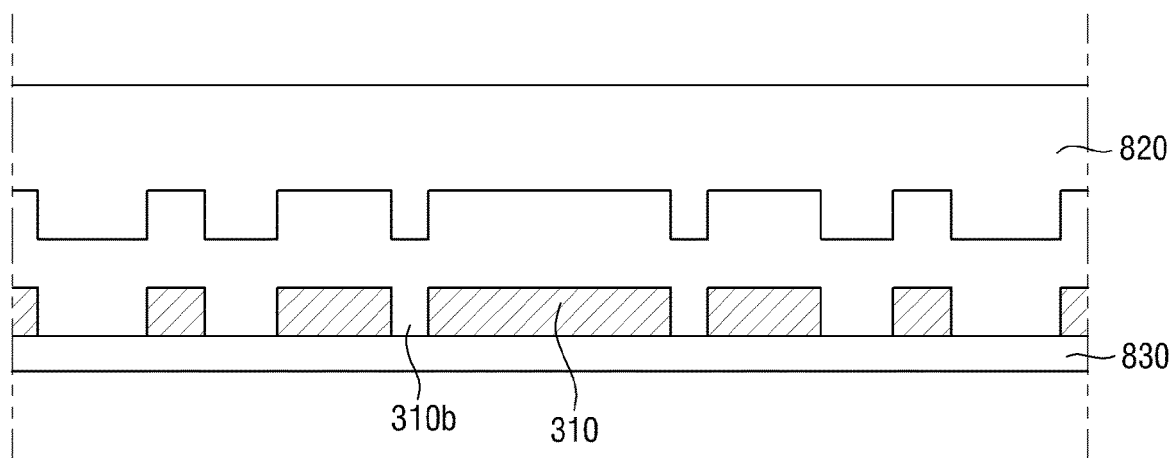
FIG. 18 is a schematic diagram showing an example of operation S300 of FIG. 15.
Figure 19:
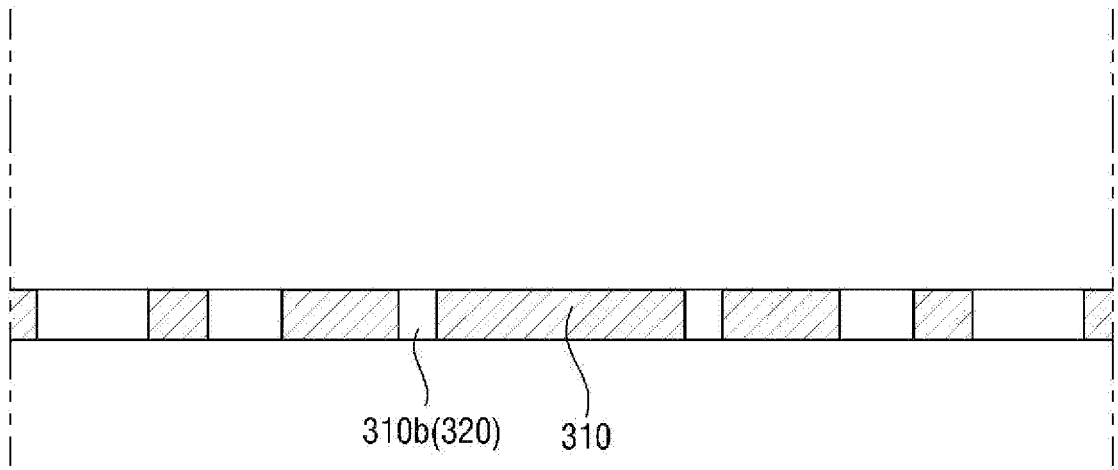
FIG. 19 is a schematic cross-sectional view showing a light transmission adjustment layer manufactured as shown in FIGS. 16 to 18.

FIG. 15 is a flowchart showing a method of manufacturing a light transmission adjustment layer according to an embodiment. FIGS. 16 to 18 are schematic diagrams showing the method of manufacturing the light transmission adjustment layer as shown in FIG. 15. FIG. 19 is a schematic cross-sectional view showing a light transmission adjustment layer manufactured as shown in FIGS. 16 to 18.

Referring to FIGS. 3 and 15 to 18, a method of manufacturing S10 a light transmission adjustment layer 300 according to an embodiment may include preparing a light reflection layer 310 (S100), forming openings 310b in the light reflection layer 310 (S200), applying a light absorption material to the openings 310b (S300), and a curing the light absorption material (S400).

The light reflection layer 310 that does not include the openings 310b may be prepared (S100).

In detail, the light reflection layer 310 before the light transmission adjustment layer 300 is manufactured may have the same planar shape as the light transmission adjustment layer 300. In an embodiment, the light reflection layer 310 may have a single layer.

The openings 310b patterned in the light reflection layer 310 may be formed (S200).

In detail, referring to FIG. 17, a mold 810 may be produced to protrude in the same pattern as that of the openings 310b, and the patterned mold 810 may be pressed onto the light reflection layer 310 to form the openings 310b on the light reflection layer 310. However, the disclosure is not limited thereto, and there may be various methods of forming the openings 310b on the light reflection layer 310. For example, the methods may include laser processing, pore-shaped inkjet printing, and other methods within the spirit and scope of the disclosure.

When the mold 810 is produced, the mold 810 may be formed in substantially the same pattern as that of the openings 310b, and the height of the protrusion may be substantially greater than the thickness of the light reflection layer 310. By the height of the protrusion of the mold 810 being formed to be substantially greater than the thickness of the light reflection layer 310, the openings 310b may be formed to completely pass through the light reflection layer 310.

A light absorption material may be applied to the patterned openings 310b of the light reflection layer 310 (S300).

In detail, referring to FIG. 18, the light reflection layer 310 where the openings 310b produced as shown in FIG. 17 are disposed may be disposed on an application apparatus substrate 830. Like the mold of FIG. 17, an application apparatus 820 formed to protrude in the same pattern as that of the openings 310b may be produced, and the application apparatus 820 may be disposed on the application apparatus substrate 830. The application apparatus 820 may be disposed over the light reflection layer 310 disposed on the application apparatus substrate 830. The protrusion of the application apparatus 820 may be matched and overlapped with the pattern of the plurality of openings 310b formed on the light reflection layer 310 in the third direction. After the protrusion of the application apparatus 820 is matched with the pattern of the openings 310b of the light reflection layer 310, a light absorption material may be applied to the openings 310b such that the light absorption material fills only the openings 310b.

Fourth, the light absorption material applied to the plurality of openings 310b may be cured (S400). A method of curing the light absorption material applied to the plurality of openings 310b is not limited. For example, the curing may be performed through thermal curing, ultraviolet (UV) curing, or the like. The UV curing may prevent deformation due to heat compared to the thermal curing.

In the light transmission adjustment layer 300 produced by the method of FIGS. 15 to 18, one surface of the light reflection layer 310 may be coplanar with one surface of the light absorption layer 320, as shown in FIG. 19. Likewise, the other surface opposite to the one surface of the light reflection layer 310 may be coplanar with the other surface opposite to the one surface of the light absorption layer 320. Accordingly, by selectively applying a light absorption material forming the light absorption layer 320 to only a necessary location, it is possible to reduce the material cost of the light absorption material.

Figure 20:
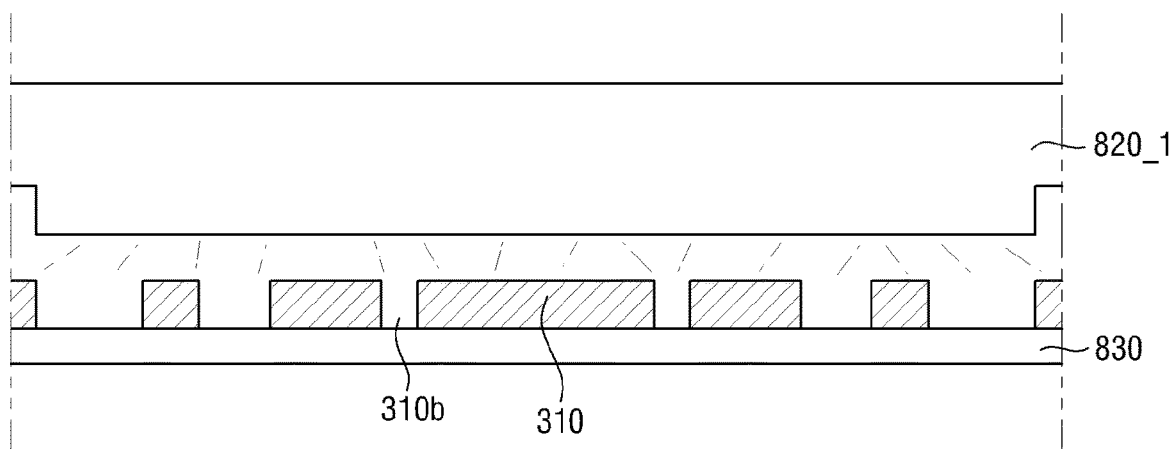
FIG. 20 is a schematic diagram showing another example of operation S300 of FIG. 15.
Figure 21:
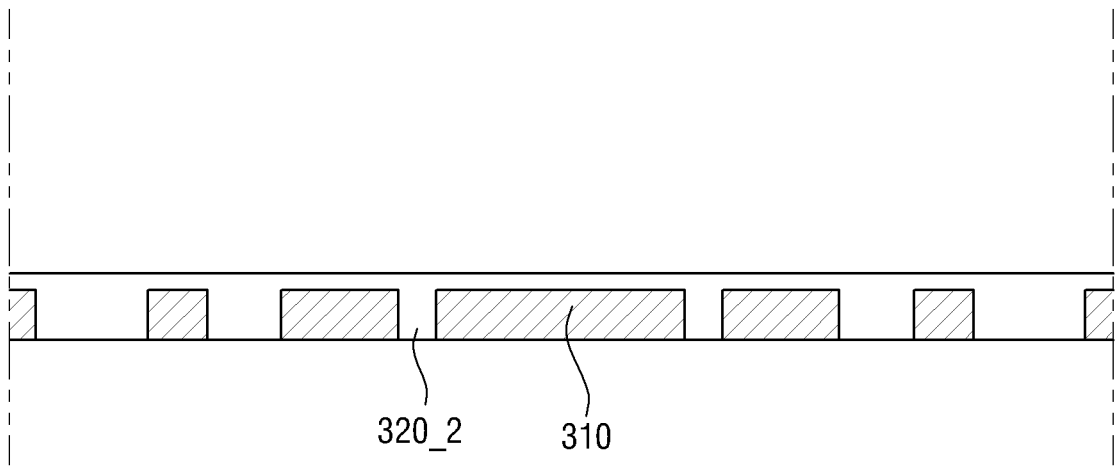
FIG. 21 is a schematic cross-sectional view showing a light transmission adjustment layer manufactured as shown in FIGS. 16, 17, and 20.

FIG. 20 is a schematic diagram showing another example of operation S300 of FIG. 15. FIG. 21 is a sectional view showing a light transmission adjustment layer manufactured as shown in FIGS. 16, 17, and 20.

Referring to FIG. 20, third, the light absorption material may be entirely applied to the light reflection layer 310 (S300_1).

The protrusion of an application apparatus 820_1 of FIG. 20 for spaying the light absorption material may be different from that of the application apparatus 820 of FIG. 18. In detail, the protrusion of the application apparatus 820_1 of FIG. 20 for spaying the light absorption material may not be patterned. Accordingly, the application apparatus 820_1 may entirely apply the light absorption material to the light reflection layer 310. Accordingly, the light absorption material may fill all the space of the openings 310b disposed in the light reflection layer 310 and then may entirely cover one surface of the light reflection layer 310.

Accordingly, in a light transmission adjustment layer 300_1 produced by the method of FIG. 20, as shown in FIG. 21, the other surface opposite to one surface of the light reflection layer 310 may be coplanar with the other surface of the light absorption layer 320_2, and the one surface of the light reflection layer 310 may be entirely covered by the light absorption layer 320_2. Accordingly, one surface of the light transmission adjustment layer 300_1 may be formed by one surface of the light absorption layer 320_2.

Referring to FIGS. 8 and 21, the one surface of the light absorption layer 320_2 of the light transmission adjustment layer 300_1 produced as shown in FIG. 21 may be disposed opposite the upper surface of the substrate 110, as shown in FIG. 8. Unlike this, when the one surface of the light absorption layer 320_2 of the light transmission adjustment layer 300_1 is disposed opposite the lower surface of the diffusion plate 400, the absorptivity of yellow light converted in wavelength by the wavelength conversion film 500 may be increased by the entirely disposed light absorption layer 320_2, and thus the loss of the yellow light may be increased.

By entirely applying the light absorption material to the light reflection layer 310, the application apparatus 820_1 corresponding to the pattern of the openings 310b may not be separately produced. Accordingly, even when the light transmission adjustment layer 300 forms openings in various patterns, the application apparatus 820 may not be newly produced, and thus it is possible to achieve a reduction in material cost and time.

Figure 22:
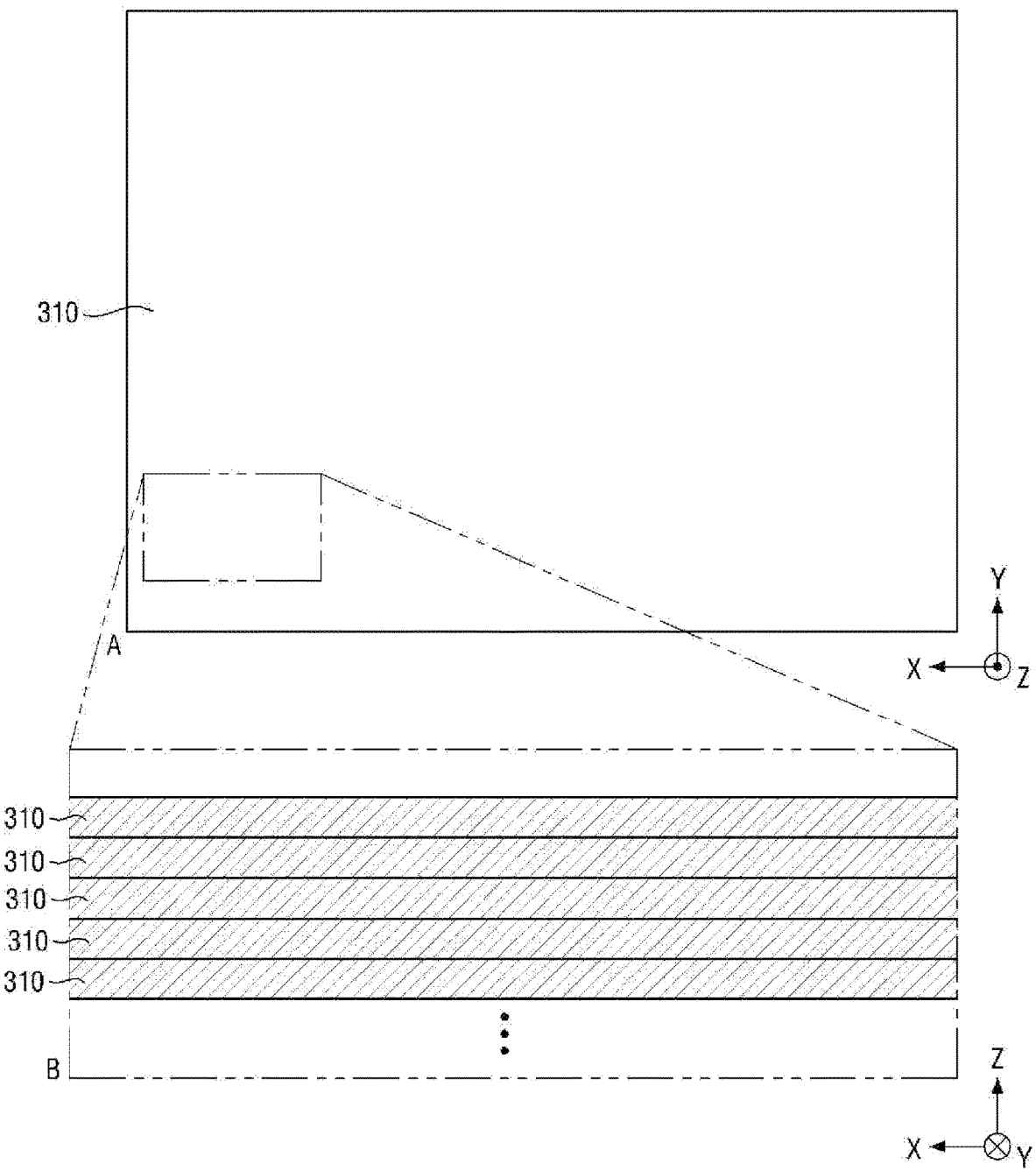
FIG. 22 is a schematic diagram showing another example of operation S100 of FIG. 15.
Figure 23:
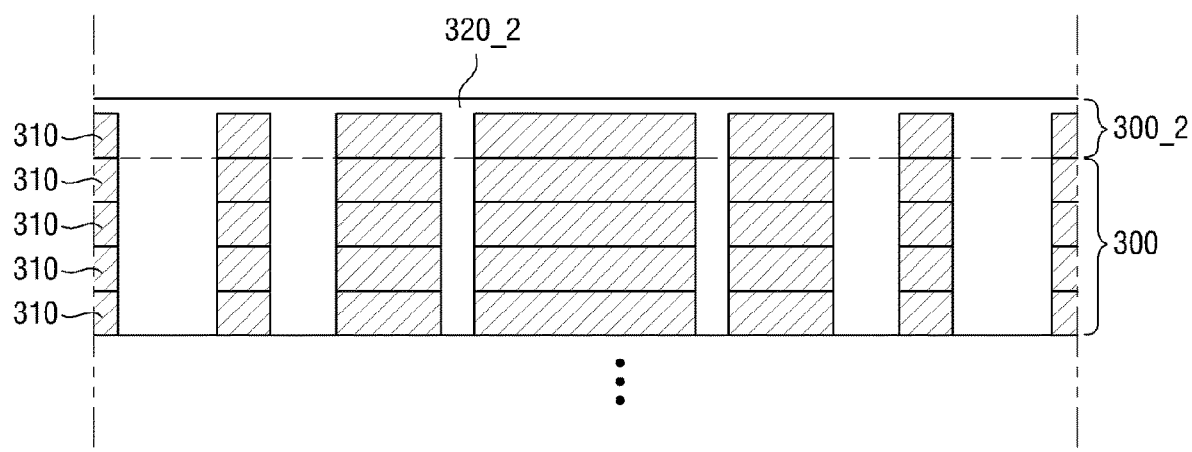
FIG. 23 is a schematic cross-sectional view showing a light transmission adjustment layer manufactured as shown in FIGS. 17, 20, and 22.

FIG. 22 is a schematic diagram showing another example of operation S100 of FIG. 15. FIG. 23 is a sectional view showing a light transmission adjustment layer manufactured as shown in FIGS. 17, 20, and 22.

Referring to FIG. 22, first, a plurality of such light reflection layers 310 may be prepared (S100_1).

Referring to FIGS. 20, 22, and 23, the plurality of light reflection layers 310 may be disposed in an overlapping manner, and openings may be formed therein. Then, a pattern characteristic pigment may be entirely applied to the plurality of light reflection layers 310 by the method as shown in FIG. 20.

As shown in FIG. 23, when the light absorption material is entirely applied to the plurality of light reflection layers 310 including the openings 310b, a light transmission adjustment layer 300_2 disposed at the uppermost side in the third direction Z may be the same as the light transmission adjustment layer 300_2 of FIG. 21, and a plurality of light transmission adjustment layers 300 disposed below the light transmission adjustment layer 300_2 disposed at the uppermost side in the third direction Z may be the same as the light transmission adjustment layer 300 of FIG. 19. In this case, the plurality of light transmission adjustment layers 300 disposed below the light transmission adjustment layer 300_2 may be used while the light transmission adjustment layer 300_2 disposed at the uppermost side in the third direction Z is not used. In this case, even when the light transmission adjustment layer 300 forms openings in various patterns, the application apparatus 820 may not be newly produced, and thus it is possible to shorten working time and improve production efficiency.

With the backlight unit according to an embodiment, by placing the light transmission adjustment layer between the light source and the diffusion plate despite a decrease in optical distance, light diffusion may be increased, and thus it is possible to improve luminance uniformity. Also, by placing the patterned absorption layer between the light source and the diffusion plate, light of a specific wavelength may be absorbed, and thus it is possible to improve chrominance.

With the backlight unit according to some embodiments, by adjusting the area of the patterned absorption layer, it is possible to perform luminance adjustment and chrominance adjustment independently.

The disclosure is not limited to the above-described advantageous effects, and other various effects are included in this specification.

Those skilled in the art will appreciate that many variations and modifications can be made to the embodiments without substantially departing from the principles of the disclosure. Therefore, the disclosed embodiments are described in a general and descriptive sense only and not for purposes of limitation.

What is claimed is:

1. A backlight unit comprising:
a substrate;
a plurality of light sources disposed on a surface of the substrate; and
a light transmission adjustment layer disposed on the surface of the substrate and spaced apart from the plurality of light sources in a thickness direction,
wherein the light transmission adjustment layer comprises:
a light reflection layer having a plurality of openings disposed therein; and
a light absorption layer containing a light absorption material that is disposed in the plurality of openings and absorbs light having predetermined wavelength bands.

2. The backlight unit of claim 1, wherein
the plurality of light sources emit light having a first wavelength band, and
the light absorption layer transmits the light having the first wavelength band.

3. The backlight unit of claim 2, further comprising a wavelength conversion film disposed above the light transmission adjustment layer to convert the light having the first wavelength band into light having a second wavelength band different from the first wavelength band.

4. The backlight unit of claim 3, wherein the light absorption material of the light absorption layer absorbs the light having the second wavelength band.

5. The backlight unit of claim 3, further comprising a diffusion plate disposed between the light transmission adjustment layer and the wavelength conversion film.

6. The backlight unit of claim 1, wherein,
the light reflection layer includes:
one surface facing the plurality of light sources; and
another surface opposite the one surface, and
the light absorption layer is disposed to fill the plurality of openings and cover the one surface or the another surface of the light reflection layer around the plurality of openings.

7. The backlight unit of claim 6, wherein the light absorption layer exposes a portion of the another surface of the light reflection layer in the thickness direction.

8. The backlight unit of claim 6, wherein the light absorption layer is disposed to entirely cover the one surface of the light reflection layer.

9. The backlight unit of claim 1, wherein an interval between the plurality of openings decreases as the plurality of openings are away from corresponding ones of the plurality of light sources.

10. The backlight unit of claim 1, wherein the plurality of openings are disposed to surround the plurality of light sources.

11. A backlight unit including unit light source regions arranged in a matrix shape, the backlight unit comprising:
a light source member comprising:
a substrate; and
a plurality of light sources disposed on a surface of the substrate; and
a light transmission adjustment layer comprising:
a light reflection layer disposed above the light source member and overlapped with the light source member, the light reflection layer having a plurality of openings disposed therein; and
a light absorption layer within the plurality of openings, wherein,
the plurality of light sources are disposed in the unit light source regions,
each of the unit light source regions comprises:
a light reflection region where light emitted by a corresponding light source is reflected; and
a light transmission region where the light emitted by the light source is transmitted,
the light reflection layer is disposed in the light reflection region, and
the plurality of openings are disposed in the light transmission region.

12. The backlight unit of claim 11, wherein,
the light transmission region comprises a plurality of patterned light transmission regions, and
the plurality of patterned light transmission regions are spaced apart from one another.

13. The backlight unit of claim 12, wherein the light reflection region is disposed substantially at the center of each of the unit light source regions.

14. The backlight unit of claim 12, wherein a first opening disposed in a first light transmission region spaced a first distance from the center of each of the unit light source regions has a substantially smaller area than a second opening disposed in a second light transmission region spaced a second distance, which is substantially greater than the first distance, from the center.

15. The backlight unit of claim 11, wherein the plurality of light sources are disposed substantially at the centers of the unit light source regions.

16. The backlight unit of claim 15, wherein,
the light reflection region is overlapped with the plurality of light sources in a thickness direction, and
a portion of the light reflection region is disposed substantially at the centers of the unit light source regions.

17. The backlight unit of claim 16, wherein the light reflection region disposed above the plurality of light sources has a substantially larger area than the plurality of light sources.

18. The backlight unit of claim 15, wherein
the plurality of light sources emit light having a first wavelength band, and
the light absorption layer is disposed in the light absorption region and a portion of the light reflection region and configured to transmit the light having the first wavelength band and configured to absorb light having a second wavelength band different from the first wavelength band.

19. A display device comprising:
a backlight unit comprising:
a substrate;
a light source disposed on a surface of the substrate to emit blue light;
a light reflection layer disposed above the light source, the light reflection layer having a plurality of openings disposed therein;
a light absorption layer in the plurality of openings;
a diffusion plate disposed over the light reflection layer; and a wavelength conversion film disposed above the diffusion plate to convert the blue light into yellow light; and a display panel disposed above the backlight unit, wherein the light absorption layer transmits the blue light and absorbs the yellow light.

20. The display device of claim 19, wherein, the plurality of openings are not overlapped with the light source in a thickness direction, and the light reflection layer disposed above the light source has a substantially larger width than the light source.

21. The display device of claim 20, further comprising a reflective coating layer disposed on the surface of the substrate where the light source is exposed.

* * * * *